United States Patent
Shao et al.

(10) Patent No.: US 11,943,514 B2
(45) Date of Patent: Mar. 26, 2024

(54) EPG INTERFACE PRESENTATION METHOD AND DISPLAY APPARATUS

(71) Applicant: Hisense Visual Technology Co., Ltd., Shandong (CN)

(72) Inventors: Xiaoming Shao, Shandong (CN); Chengbao Zhang, Shandong (CN); Xiangtai Xu, Shandong (CN); Hongxun Huang, Shandong (CN); Guili Jia, Shandong (CN); Xuelei Wang, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/664,313

(22) Filed: May 20, 2022

(65) Prior Publication Data
US 2022/0279230 A1     Sep. 1, 2022

Related U.S. Application Data

(63) Continuation of application No. PCT/CN2020/089142, filed on May 8, 2020.

(30) Foreign Application Priority Data

Dec. 3, 2019  (CN) .......................... 201911221796.2
Jan. 21, 2020  (CN) .......................... 202010071414.9
Feb. 18, 2020  (CN) .......................... 202010098529.7

(51) Int. Cl.
*H04N 21/482* (2011.01)
*H04N 21/422* (2011.01)
*H04N 21/438* (2011.01)

(52) U.S. Cl.
CPC ... *H04N 21/4821* (2013.01); *H04N 21/42204* (2013.01); *H04N 21/42216* (2013.01); *H04N 21/4383* (2013.01)

(58) Field of Classification Search
None
See application file for complete search history.

(56) References Cited

U.S. PATENT DOCUMENTS 5,598,523 A  *  1/1997  Fujita ................... G06F 3/0489
                                                      348/E7.018
6,177,931 B1 *  1/2001  Alexander ....... H04N 21/42204
                                                      348/E7.071
(Continued)

FOREIGN PATENT DOCUMENTS

CN         1269097 A        10/2000
CN         1337825 A         2/2002
(Continued)

OTHER PUBLICATIONS

How to Use the Bottom 4 Keys of Hisense Remote Control? No response to pressing the TV. Red, yellow, green and blue . . . , https://zhidao.baidu.com/question/1862406923094294107.html, May 17, 2022.
(Continued)

*Primary Examiner* — An Son P Huynh
(74) *Attorney, Agent, or Firm* — ANOVA LAW GROUP, PLLC

(57) ABSTRACT

A method for presenting EPG user interface, including: in response to a first input command, displaying an EPG user interface including a first presentation page; and in response to a second input command, switching the EPG user interface from the first presentation page to a second presentation page, where the first presentation page includes a first set of channels and programs in a first time period corresponding to the first set of channels; and the second presentation page includes the first set of channels and programs in a second time period corresponding to the first set of channels.

20 Claims, 13 Drawing Sheets

(56) References Cited

U.S. PATENT DOCUMENTS

| | | | |
|---|---|---|---|
| 8,108,886 B1* | 1/2012 | Murahashi | H04N 21/812 |
| | | | 725/9 |
| 10,075,775 B2* | 9/2018 | Cain | H04N 21/434 |
| 10,448,107 B2* | 10/2019 | Kim | H04N 21/4722 |
| 2001/0013126 A1* | 8/2001 | Lemmons | H04N 21/4314 |
| | | | 725/39 |
| 2002/0083449 A1 | 6/2002 | Im | |
| 2004/0128684 A1* | 7/2004 | Suga | H04N 7/16 |
| | | | 348/E7.054 |
| 2005/0005288 A1* | 1/2005 | Novak | H04N 21/441 |
| | | | 348/E5.103 |
| 2005/0138656 A1* | 6/2005 | Moore | H04N 7/165 |
| | | | 348/E7.063 |
| 2006/0080708 A1* | 4/2006 | Miyazawa | H04N 21/4438 |
| | | | 725/100 |
| 2006/0271962 A1 | 11/2006 | Staunton-Lambert et al. | |
| 2007/0288959 A1* | 12/2007 | Istvan | H04N 21/4751 |
| | | | 725/39 |
| 2008/0060007 A1* | 3/2008 | Matsubayashi | H04N 5/50 |
| | | | 725/39 |
| 2008/0246890 A1 | 10/2008 | Henty | |
| 2008/0282289 A1* | 11/2008 | Drazin | H04N 21/488 |
| | | | 725/40 |
| 2009/0025032 A1* | 1/2009 | Morita | H04N 21/482 |
| | | | 725/39 |
| 2009/0037955 A1* | 2/2009 | Green | H04N 21/4821 |
| | | | 725/42 |
| 2009/0113474 A1* | 4/2009 | Green | H04N 21/4316 |
| | | | 725/39 |
| 2013/0276030 A1* | 10/2013 | Fujimoto | H04N 21/482 |
| | | | 725/40 |
| 2014/0196090 A1* | 7/2014 | Kataoka | H04N 21/8153 |
| | | | 725/43 |
| 2016/0029347 A1* | 1/2016 | Liu | H04W 48/16 |
| | | | 455/434 |
| 2016/0366481 A1* | 12/2016 | Lim | H04N 21/478 |
| 2018/0109754 A1* | 4/2018 | Kwon | G06F 3/0482 |
| 2019/0306576 A1* | 10/2019 | Shimizu | H04H 60/18 |

FOREIGN PATENT DOCUMENTS

| | | |
|---|---|---|
| CN | 1980349 A | 6/2007 |
| CN | 101433088 A | 5/2009 |
| CN | 101630987 A | 1/2010 |
| CN | 103237254 A | 8/2013 |
| CN | 104145434 A | 11/2014 |
| CN | 105120309 A | 12/2015 |
| CN | 109361942 A | 2/2019 |
| CN | 110012340 A | 7/2019 |
| EP | 2169950 A2 | 3/2010 |
| JP | 2008078998 A | 4/2008 |

OTHER PUBLICATIONS

International Search Report, China International Search Authority, dated Aug. 28, 2020, from PCT/CN2020/089142 filed May 8, 2020.
Extended European Search Report, dated Mar. 15, 2023, for European Application No. 20728901.8.
European Standard: "Digital Video Broadcasting (DVB); Specification for Service Information (SI) in DVB Systems", May 1, 2014, Retrieved from the Internet URL:http://www.etsi.org/deliver/etsi_en/300400_300499/300468/01.14.01_60/en_300468v011401p.pdf, retrieved Aug. 1, 2014, pp. 22-32, 113-126, 53-55.

* cited by examiner

EPG INTERFACE PRESENTATION METHOD AND DISPLAY APPARATUS

This application is a continuation application of International Application No. PCT/CN2020/089142 filed May 8, 2020, which claims the priorities from Chinese Patent Application No. 201911221796.2 filed on Dec. 3, 2019, Chinese Patent Application No. 202010071414.9 filed on Jan. 21, 2020, and Chinese Patent Application No. 202010098529.7 filed on Feb. 18, 2020, which are hereby incorporated by reference in their entirety.

TECHNICAL FIELD

The disclosure relates to digital media technology, and in particular, to a presentation method of an Electronic Program Guide (EPG) user interface and a display apparatus.

BACKGROUND

When a display apparatus presents an Electronic Program Guide (EPG) user interface, the program information of some channels during the current time period is shown in the EPG user interface, and the focus is on the program being played by the display apparatus before presenting the EPG user interface.

Now the display apparatus generally controls the focus to move by receiving a command via a directional key on a remote controller. When the focus moves to the edge of the EPG user interface, the EPG user interface presents the corresponding program information if a command via the directional key is received again. For example, when the focus is on the right edge of the EPG user interface, in response to a command via a right directional key, the EPG user interface presents the program information of the current channel in a next time period. For another example, when the focus is on the lower edge of the EPG user interface, in response to a command via a down directional key, the EPG user interface presents the program information of other channels in the current time period.

However, the process of moving the focus to the edge of the EPG user interface and presenting the corresponding program information through the directional keys requires the user to press the directional keys many times, which is complicated and affects user's experience.

SUMMARY

Embodiments of the disclosure provide a presentation method of an EPG user interface in a display apparatus and a display apparatus.

The embodiments of the application provides a display apparatus, including: a display configured to display an image; a remote controller with at least one key; a user input interface configured to receive an user input from the remote controller; a controller in communication with the display and the user input interface, and configured to: display a program image on the display; in response to a first input command from a user, display an EPG user interface on the display; where the EPG user interface comprises a first presentation page, and the first presentation page comprises a first set of channels and programs corresponding to the first set of channels in a first time period; in response to a second input command associated with a first shortcut key on the remote controller, switch the EPG user interface from the first presentation page to a second presentation page, where the second presentation page comprises the first set of channels and programs corresponding to the first set of channels in a second time period different from the first time period, where a difference between the first time period and the second time period is a preset time unit, the shortcut key is configured for the EPG user interface and visually indicated on the EPG user interface.

The embodiments of this application provides a presentation method of an EPG user interface, including: displaying, by a display apparatus, a program image on a display of the display apparatus; in response to a first input command from a user, displaying, by the display apparatus, the EPG user interface on the display; where the EPG user interface comprises a first presentation page, and the first presentation page comprises a first set of channels and programs corresponding to the first set of channels in a first time period; in response to a second input command associated with a first shortcut key on the remote controller, switching the EPG user interface from the first presentation page to a second presentation page, where the second presentation page comprises the first set of channels and programs corresponding to the first set of channels in a second time period different from the first time period, where a difference between the first time period and the second time period is a preset time unit, the shortcut key is configured for the EPG user interface and visually indicated on the EPG user interface.

DETAILED DESCRIPTION

In order to make the purposes, embodiments and advantages of the disclosure clearer, the embodiments of the disclosure will be described clearly and completely below in combination with the accompanying drawings in embodiments of the disclosure. Obviously the described embodiments are only some but not all the embodiments. Based upon embodiments of the disclosure, all of other embodiments obtained by those ordinary skilled in the art without creative work shall fall within the protection scope of the disclosure.

Figure 1A:
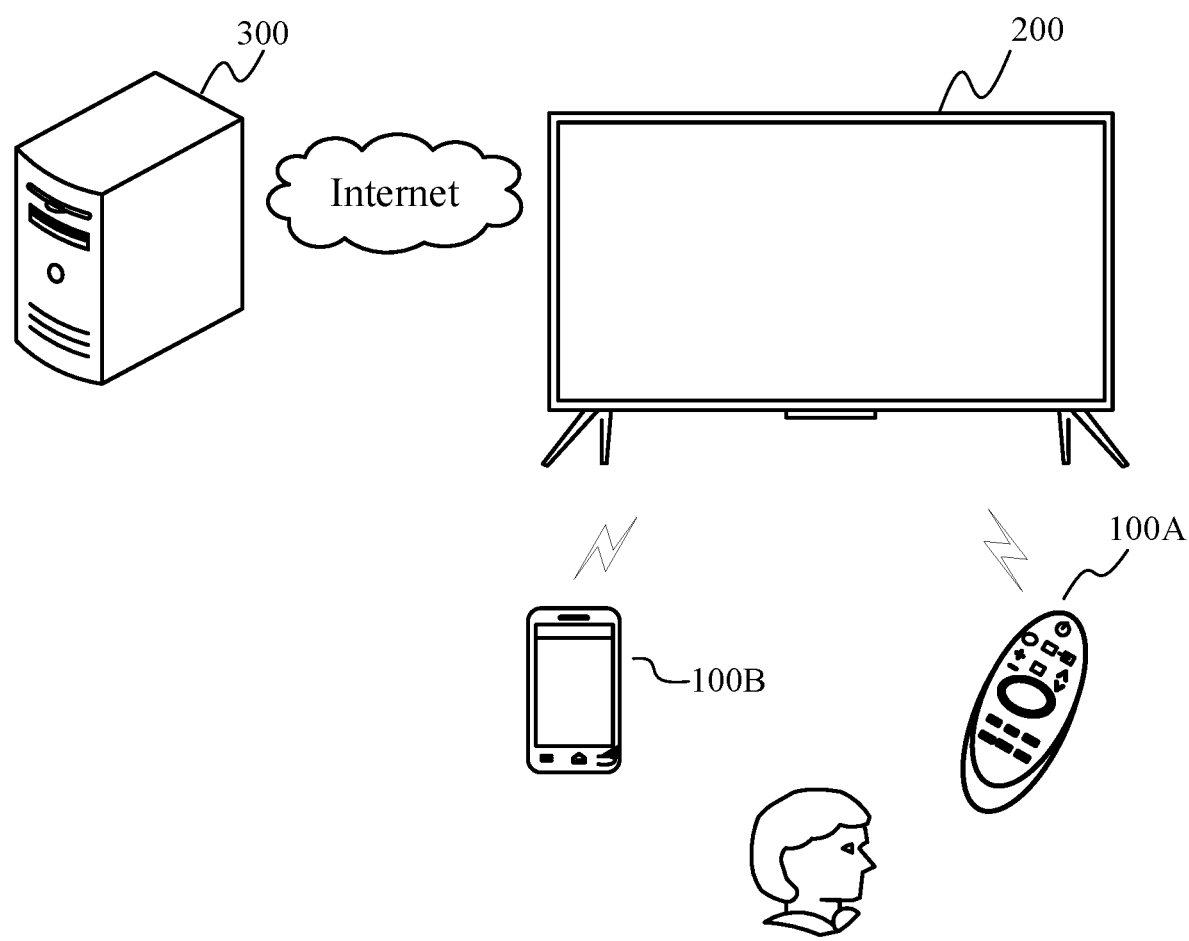
FIG. 1A shows a schematic diagram of an operation scenario between a display apparatus and a control device according to an embodiment.

FIG. 1A shows a schematic diagram of a scenario between a display apparatus and a control device in an embodiment. As shown in FIG. 1A, the communications between the control device 100 and the display apparatus 200 may be performed in a wired or wireless manner.

The control device 100 is configured to control the display apparatus 200, receive a command input from the user, and convert the command into an instruction that can be recognized and responded by the display apparatus 200, which serves an intermediary media between the user and the display apparatus 200. For example, the user operates the channel +/− keys on the control device 100, and the display apparatus 200 responds to the channel +/− operations.

The control device 100 may be a remote controller 100A, which includes the infrared protocol communication or Bluetooth protocol communication and other short-range communication methods, etc., and controls the display apparatus 200 wirelessly or by other wired methods. The user may input commands through the keys on the remote controller, voice inputs, control panel inputs, etc. to control the display apparatus 200. For example, the user may input corresponding commands through the volume +/− keys, channel keys, up/down/left/right directional keys, voice input keys, menu key, power key, etc. on the remote controller to control the functions of the display apparatus 200.

The control device 100 may also be a smart device, such as a mobile terminal 100B, a tablet computer, a computer, a notebook computer, etc. For example, an application running on the smart device is used to control the display apparatus 200. This application may be configured to provide the user with various controls through an intuitive User Interface (UI) on the screen associated with the smart device.

In some embodiments, the mobile terminal 100B and the display apparatus 200 may install software applications, and implement the connection and communication through the network communication protocols, achieving the purpose of one-to-one control operation and data communication. For example, the mobile terminal 100B and the display apparatus 200 may establish an instruction protocol, and the functions of the physical keys arranged in the remote controller 100A are realized by operating various function keys or virtual buttons on the user interface provided on the mobile terminal 100B. The audio and video content displayed on the mobile terminal 100B may also be transmitted to the display apparatus 200 to realize the synchronous display function.

The display apparatus 200 may provide a broadcast receiving function and a computer supported network TV function. The display apparatus may be implemented as digital TV, Internet TV, Internet Protocol TV (IPTV), etc.

The display apparatus 200 may be a liquid crystal display, an organic light emitting display, or a projection device. The specific type, size and resolution of the display apparatus are not limited.

The display apparatus 200 communicates with a server 300 through various communication methods. Here, the display apparatus 200 may be allowed to perform the communication and connection through a Local Area Network (LAN), a Wireless Local Area Network (WLAN), and other networks. The server 300 may provide various contents and interactions to the display apparatus 200. Exemplarily, the display apparatus 200 may send and receive information, for example: receive the Electronic Program Guide (EPG) data, receive the software updates, or access a remotely stored digital media library.

Figure 1B:
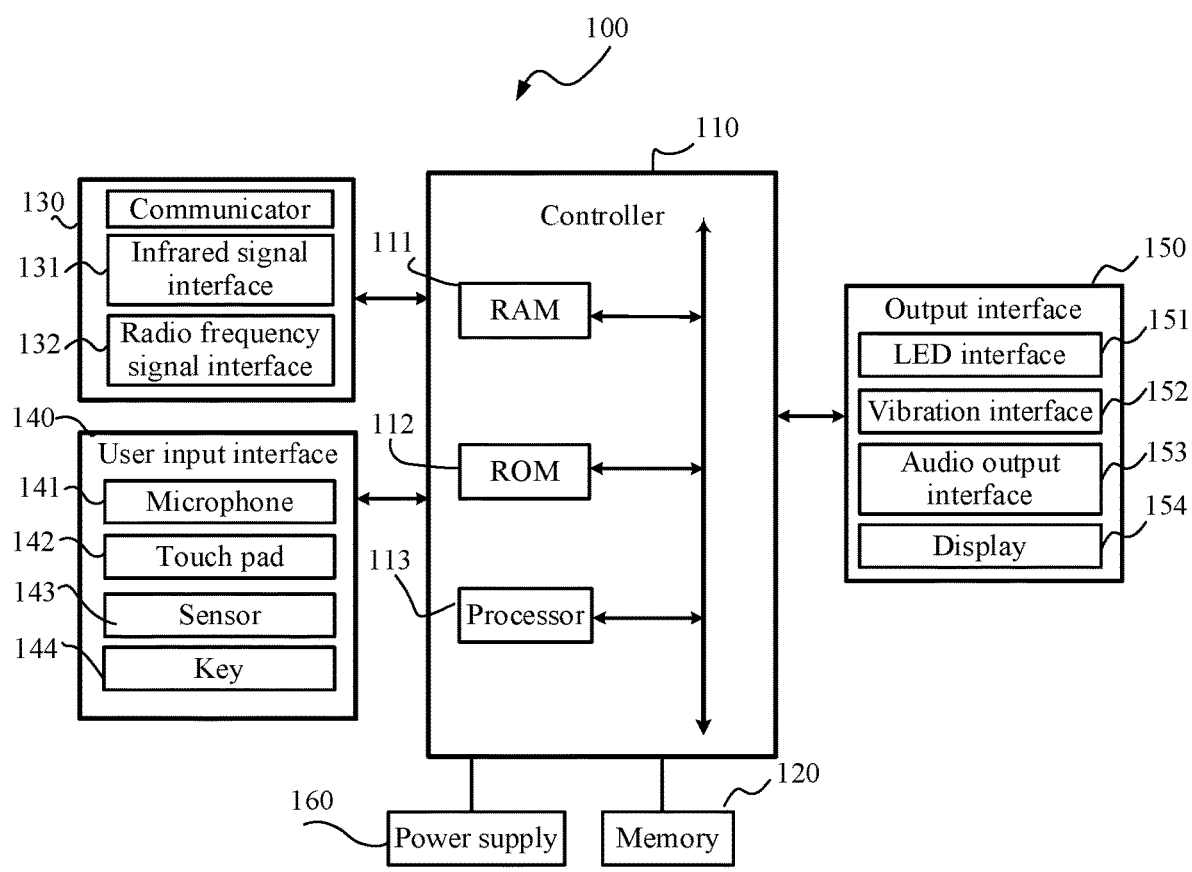
FIG. 1B shows a block diagram of the configuration of the control device 100 in FIG. 1A according to an embodiment.

FIG. 1B shows a block diagram of the configuration of the control device 100. As shown in FIG. 1B, the control device 100 includes a controller 110, a memory 120, a communicator 130, a user input interface 140, an output interface 150, and a power supply 160.

The controller 110 includes a Random Access Memory (RAM) 111, a Read Only Memory (ROM) 112, a processor 113, a communication interface and a communication bus. The controller 110 is configured to control the running and operations of the control device 100, and the communication cooperation among internal components as well as the external and internal data processing functions.

In some embodiments, when an interaction event like a user pressing a key on the remote controller 100A or touching a touch panel on the remote controller 100A is detected, the controller 110 may generate a signal corresponding to the detected event and send the signal to the display apparatus 200.

The memory 120 is used to store various operating programs, data and applications that drive and control the control device 100 under the control of the controller 110. The memory 120 may store various kinds of control signal commands input from the user.

The communicator 130 realizes the communications of control signals and data signals with the display apparatus 200 under control of the controller 110. For example, the control device 100 sends a control signal (e.g., a touch signal or a button signal) to the display apparatus 200 via the communicator 130, and the control device 100 may receive a signal sent from the display apparatus 200 via the communicator 130. The communicator 130 may include an infrared signal interface 131 and a radio frequency signal interface 132. For example, in the case of infrared signal interface, the command input from the user is converted into an infrared control signal according to the infrared control protocol and then sent to the display apparatus 200 via the infrared sending module. As another example, in the case of radio frequency signal interface, the command input from the user is converted into a digital signal, modulated according to the radio frequency control signal modulation protocol, and then the modulated signal is sent to the display apparatus 200 via the radio frequency sending module.

The user input interface 140 may include at least one of a microphone 141, a touch pad 142, a sensor 143, a key 144, etc., so that a user may input the command for controlling the display apparatus 200 to the control device 100 through voice, touch, gesture, pressing, etc.

The output interface 150 outputs a user command received from the user input interface 140 to the display apparatus 200, or outputs the image or voice signal received from the display apparatus 200. Here, the output interface 150 may include an LED interface 151, a vibration interface 152 that generates vibration, a sound output interface 153 that outputs sound, and a display 154 that outputs image, etc. For example, the remote controller 100A may receive output signal such as audio, video or data from the output interface 150, and display the output signal in the form of image on the display 154, in the form of audio on the sound output interface 153, or in the form of vibration on the vibration interface 152.

The power supply 160 is used to provide operating power support for all the elements of the control device 100 under control of the controller 110. The power supply may include battery and related control circuit.

Figure 1C:
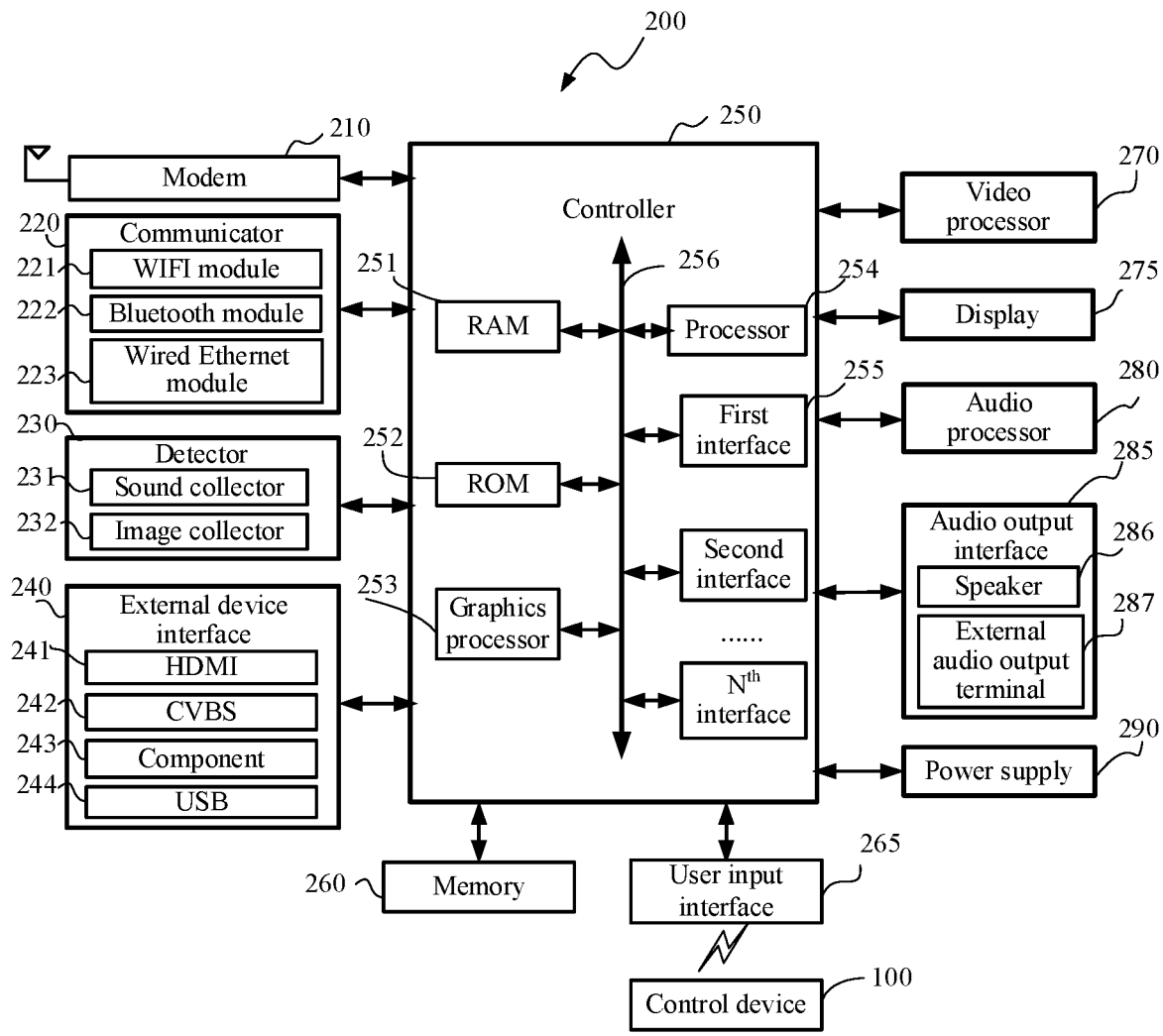
FIG. 1C shows a block diagram of the configuration of the display apparatus 200 in FIG. 1A according to an embodiment.

FIG. 1C shows a block diagram of a hardware configuration of the display apparatus 200. As shown in FIG. 1C, the display apparatus 200 may include a modem 210, a communicator 220, a detector 230, an external device interface 240, a controller 250, a memory 260, a user interface 265, a video processor 270, a display 275, an audio processor 280, an audio output interface 285, and a power supply 290.

The modem 210 receives the broadcast television signals in a wired or wireless manner, and may perform the amplification, frequency mixing, resonance and other modulation/demodulation processing, to demodulate the television audio/video signals carried in the frequency of the television channel selected by the user from multiple wireless or wired broadcast television signals, as well as additional information (e.g., EPG data).

The modem 210 may respond to the television signal frequency selected by the user and the television signal carried by the frequency according to the user's selection under control of the controller 250.

According to different television signal broadcasting formats, the modem 210 may receive signals in many forms, such as: terrestrial digital television, cable broadcasting, satellite broadcasting, or Internet broadcasting or the like; according to different modulation types, digital modulation mode or analog modulation mode may be used; and according to different types of television signals, analog signals and digital signals may be used.

In other exemplary embodiments, the modem 210 may also be in an external device, such as an external set-top box. In this way, the set-top box outputs television audio/video signals after modulation and demodulation, which are input to the display apparatus 200 through the input/output interface 240.

The communicator 220 is a component in communication with an external device or an external server according to various types of communication protocols. For example, the display apparatus 200 may send the content data to an external device connected via the communicator 220, or browse and download the content data from an external device connected via the communicator 220. The communicator 220 may include a WIFI module 221, a Bluetooth communication protocol module 222, a wired Ethernet communication protocol module 223, and other network communication protocol modules or near-field communication protocol modules, so that the communicator 220 can receive control signals of the control device 100 under the control of the controller 250 and implement the control signals as WIFI signals, Bluetooth signals, radio frequency signals, etc.

The detector 230 is a component configured for the display apparatus 200 to collect the external environment signal or the signal interacted with the outside. The detector 230 may include a sound collector 231; or may collect the environment sound for identifying the environment scene type.

In some embodiments, the detector 230 may further include an image collector 232.

In some embodiments, the detector 230 may further include a light receiver configured to collect the ambient light intensity to allow the display apparatus 200 to adjust display parameters, etc.

In other embodiments, the detector 230 may further include a temperature sensor. For example, by sensing the ambient temperature, the display apparatus 200 may adjust the display color temperature of the image accordingly. In some embodiments, when the environment has a high temperature, the color temperature of the image presented on the display apparatus 200 may be adjusted to cold color tone; when the environment has a low temperature, the image presented on the display apparatus 200 may be adjusted to warm color tone.

The external device interface 240 is a component that provides for the controller 250 to control the data transmission between the display apparatus 200 and external devices. The external device interface 240 may be connected to external devices such as set-top box, game device, laptop, etc. in a wired/wireless manner, and may receive the data such as video signals (e.g., moving images), audio signals (e.g., music), additional information (e.g., EPG), etc. of the external devices.

Here, the external device interface 240 may include: any one or more of a High-Definition Multimedia Interface (HDMI) 241, a Composite Video Blanking Synchronization (CVBS) interface 242, an analog or digital component interface 243, a Universal Serial Bus (USB) interface 244, a Component interface (not shown in the figure), a Red-Green-Blue (RGB) interface (not shown in the figure), etc.

The controller 250 controls the operations of the display apparatus 200 and responds to the user's operations by running various software control programs (such as operating system and various applications) stored on the memory 260. For example, the controller may be implemented as a System-on-a-Chip (SOC).

As shown in FIG. 1C, the controller 250 includes a Random Access Memory (RAM) 251, a Read Only Memory (ROM) 252, a graphics processor 253, a CPU processor 254, a communication interface 255, and a communication bus 256, wherein the RAM 251, the ROM 252, the graphics processor 253, the CPU processor 254 and the communication interface 255 are connected through the communication bus 256.

The graphics processor 253 is used to generate various graphics objects, such as icons, operation menus, display graphics of user input commands, etc. The graphics processor 253 may include: an arithmetic unit configured to perform the operations by receiving various interactive instructions input from users and then display various objects according to the display attributes; and a renderer configured to generate the result of rendering various objects obtained based on the arithmetic unit and display it on the display 275.

The communication interface 255 may include a first interface to an $n^{th}$ interface. These interfaces may be network interfaces connected to external devices via a network.

The controller 250 may control the overall operation of the display apparatus 200. For example, in response to receiving a user command for selecting a GUI object presented on the display 275, the controller 250 may perform the operations related to the object selected by the user input command. For example, the controller may be implemented as an SOC (System on Chip) or an MCU (Micro Control Unit).

Here, the object may be any one of objects available for selection, such as a hyperlink or an icon. The operations related to selected objects for example include: operations for displaying a hyperlinked page, document or image, or operations for launching applications corresponding to icons. User commands for selecting a GUI object can be commands input from various input devices (for example, a mouse, a keyboard, a touch pad, etc.) connected to the display apparatus 200 or voice commands corresponding to voices from the user.

The memory 260 is used to store various types of data, software programs or applications for driving and controlling the operations of the display apparatus 200. The memory 260 may include a volatile and/or non-volatile memory. The term "memory" includes the memory 260, the RAM 251 and ROM 252 of the controller 250, or a memory card in the display apparatus 200.

In some embodiments, the memory 260 is further configured to store an application for driving the controller 250 in the display apparatus 200; store various applications built in the display apparatus 200 and downloaded by the user from external devices; and store data for configuring various GUIs provided by the display 275, various GUI-related objects, and visual effect images of a selector for selecting GUI objects.

In some embodiments, the memory 260 is further configured to drive programs and related data of the modem 210, communicator 220, detector 230, external device interface 240, video processor 270, display 275 and audio processor 280, etc., for example, the external data (such as audio and video data) received from the external device interface or the user data (such as key information, voice information, touch information, etc.) received from the user interface.

In some embodiments, the memory 260 specifically stores software and/or programs for representing the Operating System (OS), where these software and/or programs may include, for example, kernel, middleware, Application Programming Interface (API), and/or applications.

Figure 1D:
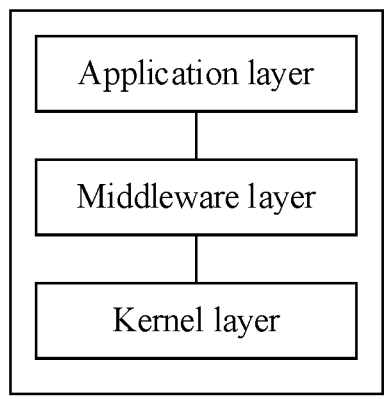
FIG. 1D shows a block diagram of the configuration architecture of an operating system in the memory of the display apparatus 200 according to an embodiment.

FIG. 1D shows a block diagram of the architecture configuration of the operating system in the memory of the display apparatus 200. The operating system architecture includes an application layer, a middleware layer and a kernel layer from top to bottom.

The middleware layer may provide some standard interfaces to support the operations of various environments and systems. For example, the middleware layer may be implemented as Multimedia and Hypermedia Information Coding Expert Group (MHEG) for data broadcast-related middleware, or may be implemented as DLNA middleware for external device communication-related middleware, or may be implemented as a middleware for providing the browser environment in which each application in the display apparatus runs, etc.

The kernel layer provides core system services, for example, file management, memory management, process management, network management, system security authority management, and other services. The kernel layer may be implemented as a kernel based on various operating systems, for example, a kernel based on a Linux operating system.

The kernel layer also provides the communication between system software and hardware, and provides device drive services for various hardware.

The user interface 265 receives various user interactions. Specifically, it is used to send the user's input signal to the controller 250 or transmit the output signal from the controller 250 to the user.

In some embodiments, the user may input a user command on the Graphical User Interface (GUI) presented on the display 275, and then the user interface 265 receives a command input from the user through the GUI. Specifically, the user interface 265 may receive the user command for controlling the position of a selector in the GUI to select different objects or items.

Alternatively, the user may input a user command by inputting particular speech or gesture, and then the user interface 265 recognizes the speech or gesture through the sensor to receive the user input command.

The video processor 270 is used to receive the video signal and perform the video data processing according to the standard codec protocol of the input signal, to obtain the video signal that can be displayed or played directly on the display 275.

The video processor 270 includes a de-multiplexing module, a video decoding module, an image synthesis module, a frame rate conversion module, a display formatting module, etc.

The display 275 is used to receive image signals input from the video processor 270, and display the video content, images and the menu control interface. The displayed video content may be the video content from the broadcast signal received by the modem 210, or may be the video content input from the communicator 220 or external device interface 240. The display 275 also presents a user control interface (UI) generated in the display apparatus 200 for controlling the display apparatus 200.

Also, the display 275 may include a panel for presenting images and a drive component that drives the image display. Alternatively, if the display 275 is a projection display, it may further include a projection device and a projection screen.

The audio processor 280 is used to receive an external audio signal, and perform the audio data processing according to the standard codec protocol of the input signal, to obtain an audio signal that can be played in the speaker 286.

In some embodiments, the audio processor 280 may support various audio formats. For example, MPEG-2, MPEG-4, Advanced Audio Coding (AAC), High Efficiency AAC (HE-AAC) and other formats.

The audio output interface 285 is used to receive the audio signal output from the audio processor 280 under the control of the controller 250, and the audio output interface 285 may include a speaker 286, or an external audio output terminal 287 output to a sound device of an external device.

In other embodiments, the video processor 270 may include one or more chips. The audio processor 280 may also include one or more chips.

In other embodiments, the video processor 270 and the audio processor 280 may be separate chips, or may be integrated into one or more chips together with the controller 250.

The power supply 290 is used to provide the power supply for the display apparatus 200 through the power input from an external power supply under the control of the controller 250. The power supply 290 may be a built-in power supply circuit installed inside the display apparatus 200, or may be a power supply installed outside the display apparatus 200.

It should be noted that, in order to select and perform related functions (e.g., image setting, sound setting, etc.) required by the image content service provided by the display apparatus 200, the display apparatus 200 provides a plurality of menu items for selecting functions. Meanwhile, referring to FIG. 1E, the control device 100 configured to control the display apparatus 200 may include a plurality of keys for selecting functions, e.g., one or more color keys, to provide indications for a user that the display apparatus 200 can perform a menu item function matching with a color key by operating the color key on the control device 100.

Here, there is a mapping relationship between the function corresponding to the above-mentioned menu items and the color key on the control device 100. Specifically, when the display apparatus 200 receives a key event value corresponding to a color key on the control device 100 input from the user, the display apparatus 200 can perform a function operation corresponding to the key event value based on the mapping relationship. As such it is convenient for the user to visually match the color keys on the control device 100 with the functions provided by the menu items.

Figure 2A:
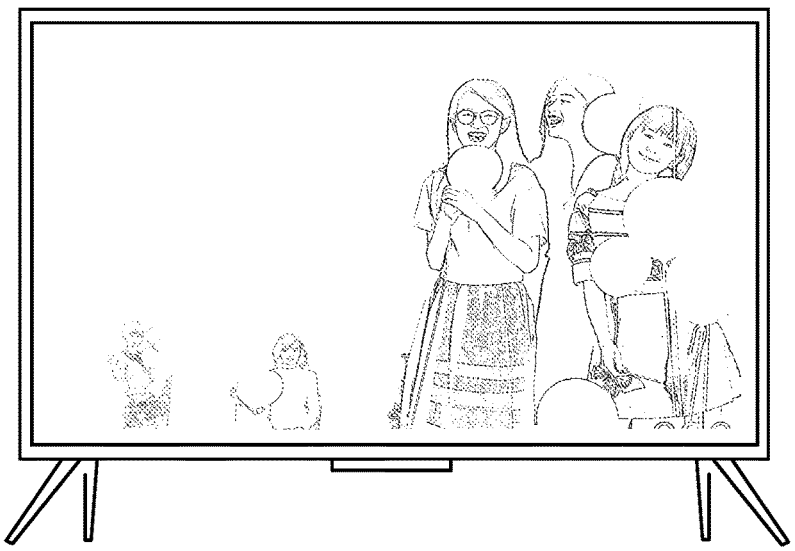
FIG. 2A shows a schematic diagram of an interface presenting a program image according to an embodiment.
Figure 2B:
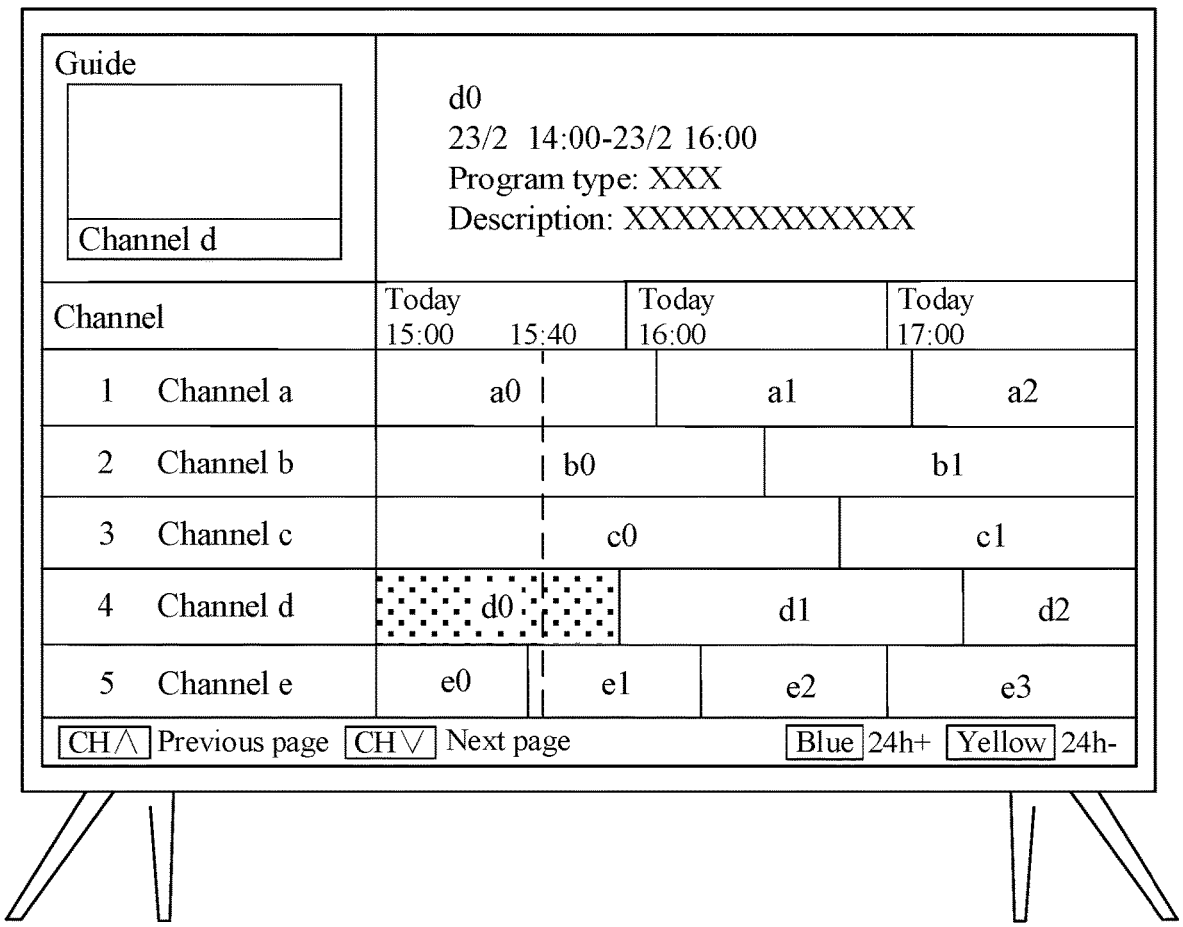
FIGS. 2B-2F shows schematic diagrams of the EPG user interface according to embodiments of the disclosure.

For example, the GUI shown in FIG. 2B provides menu items including a color key guide, where the menu item icon corresponding to the menu item 24 h+ is presented as a blue square, the menu item icon corresponding to the menu item 24 h− is presented as a yellow square, and the menu item icons corresponding to the menu items channel up and channel down are presented as CH, to allow implementation or selection of predetermined functions according to the content service provided by the GUI.

Figure 1E:
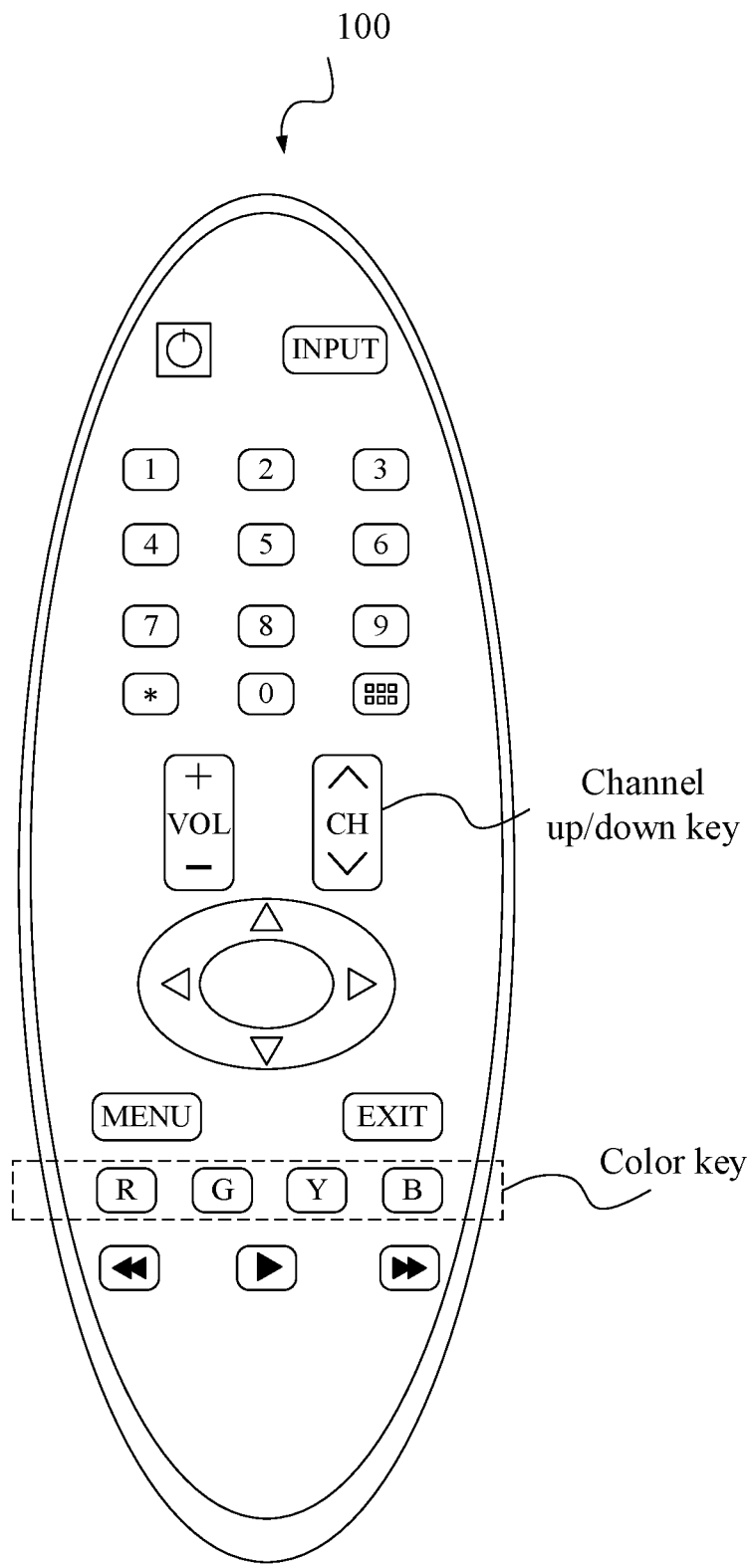
FIG. 1E shows a structural schematic diagram of the control device 100 in FIG. 1A according to an embodiment.

On the control device 100 shown in FIG. 1E, the color keys are arranged in the order of colors R, G, Y and B, where R represents the red key, G represents the green key, Y represents the yellow key, and B represents the blue key. The user operates a color key on the control device 100 (e.g., press the blue key) so that the display apparatus 200 performs the desired function in the menu item with blue indication (e.g., color key guide).

Figure 2C:
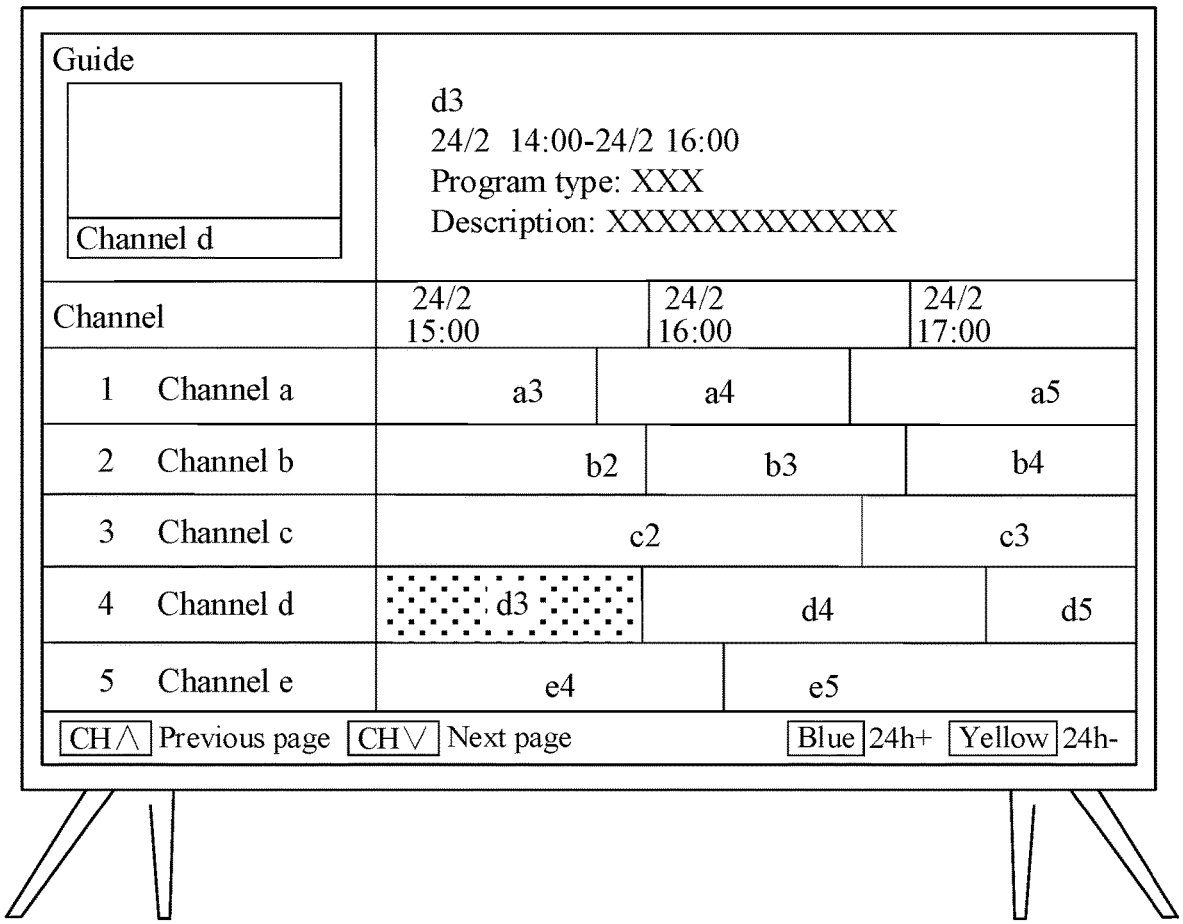

Referring to both FIGS. 2B and 1E, when the user wants to see the program menu after 24 h, the user can press the blue key (whose color indication corresponds to the blue color indication on the menu item icon) on the control device 100; and the display apparatus 200 can receive the key event value of this key, extract the information on the menu item"24 h+" corresponding said key event value, and then implement the function of displaying the program menu after 24 h. For example, the program menu after 24 h is displayed in the GUI as shown in FIG. 2C.

Figure 2D:
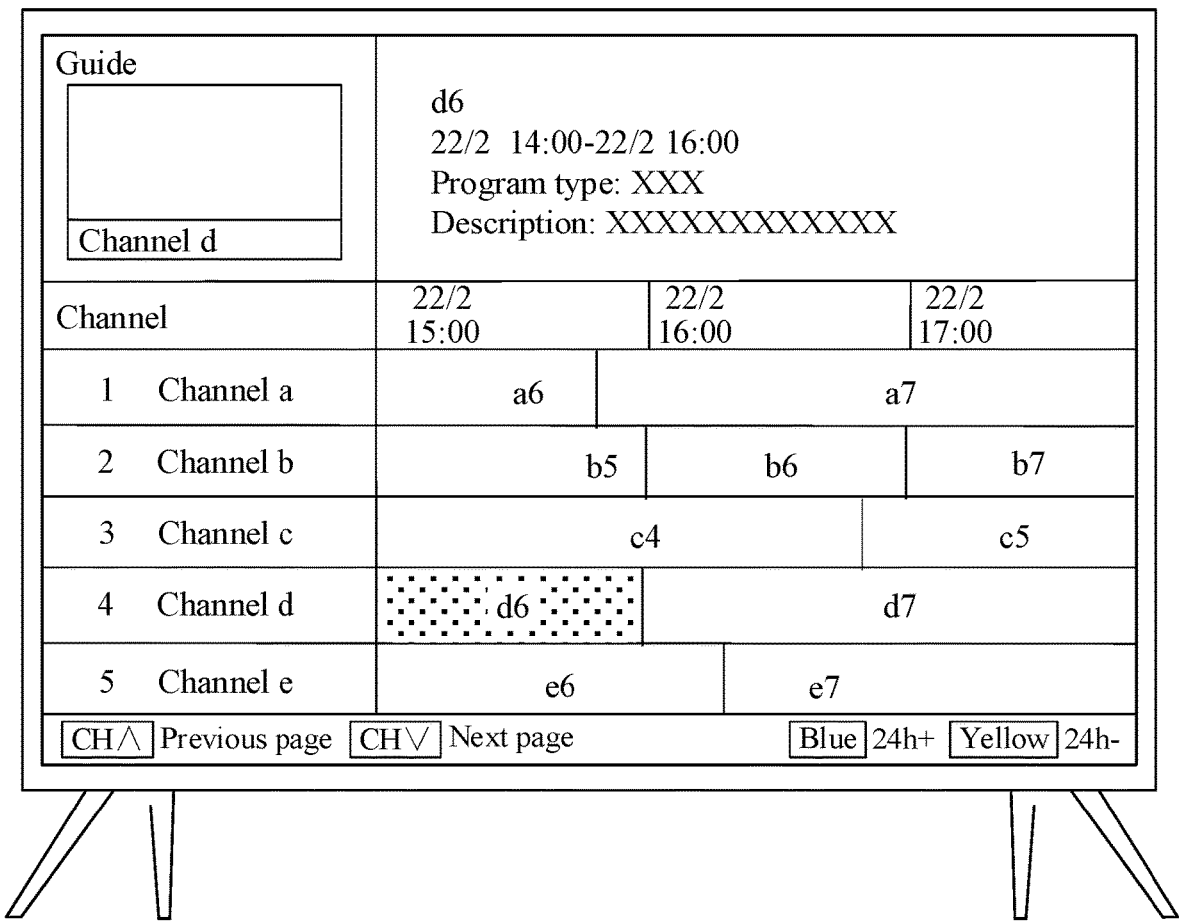

When the user wants to see the program menu before 24 h, the user can press the yellow key (whose color indication corresponds to the yellow color indication on the menu item icon) on the control device 100; and the display apparatus 200 can receive a key event value of this key, extract the information associated with the menu item icon with yellow color indication"24 h−", and then implement the function of displaying the program menu before 24 h. The program menu before 24 h is displayed in the GUI as shown in FIG. 2D.

Figure 2E:
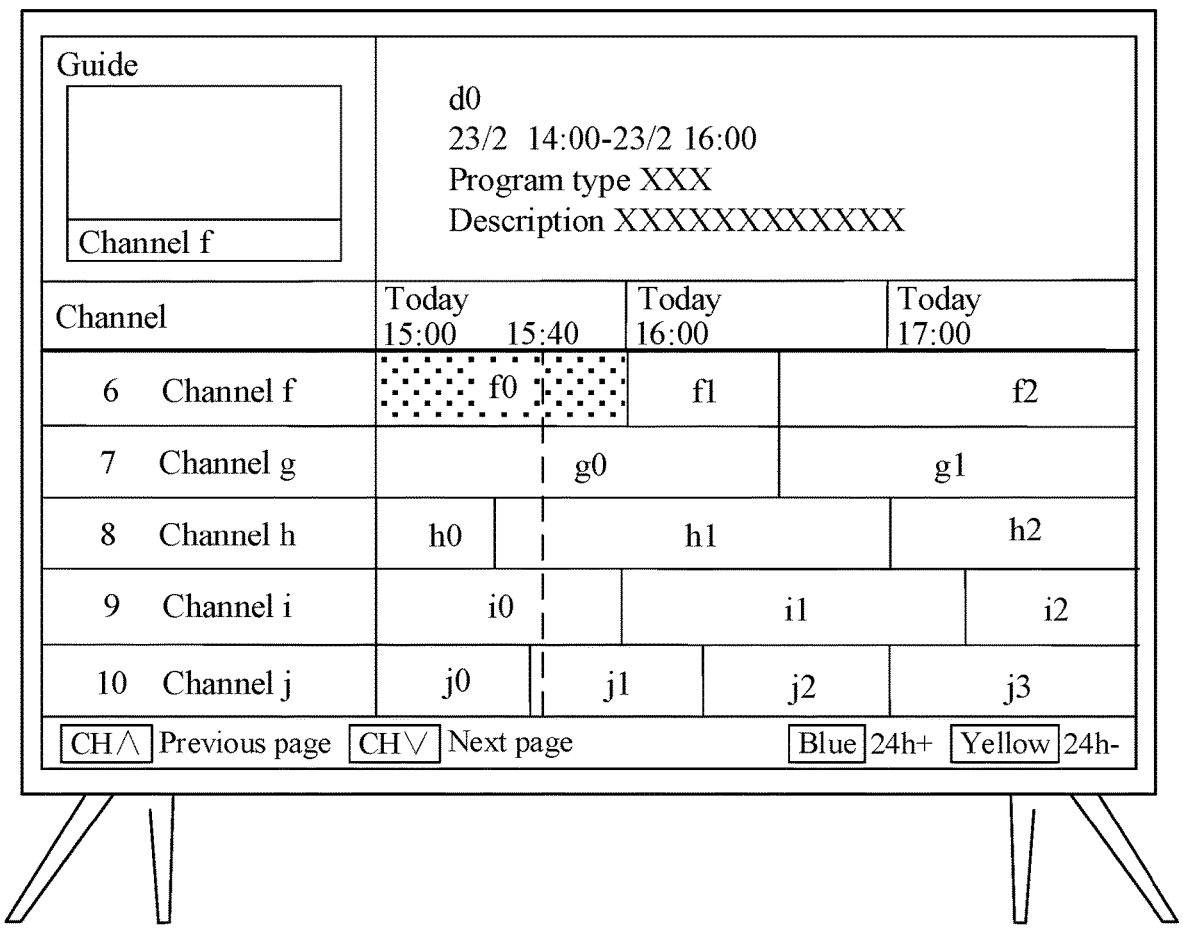

When the user wants to see the program menu of the next page, the user can press the key "CH∨" on the control device 100; and the display apparatus 200 can receive a key event value of this key, extract information corresponding to said key "channel down", and then implement the function of displaying the program menu in the next page. The program menu in the next page is displayed in the GUI as shown in FIG. 2E.

Figure 2F:
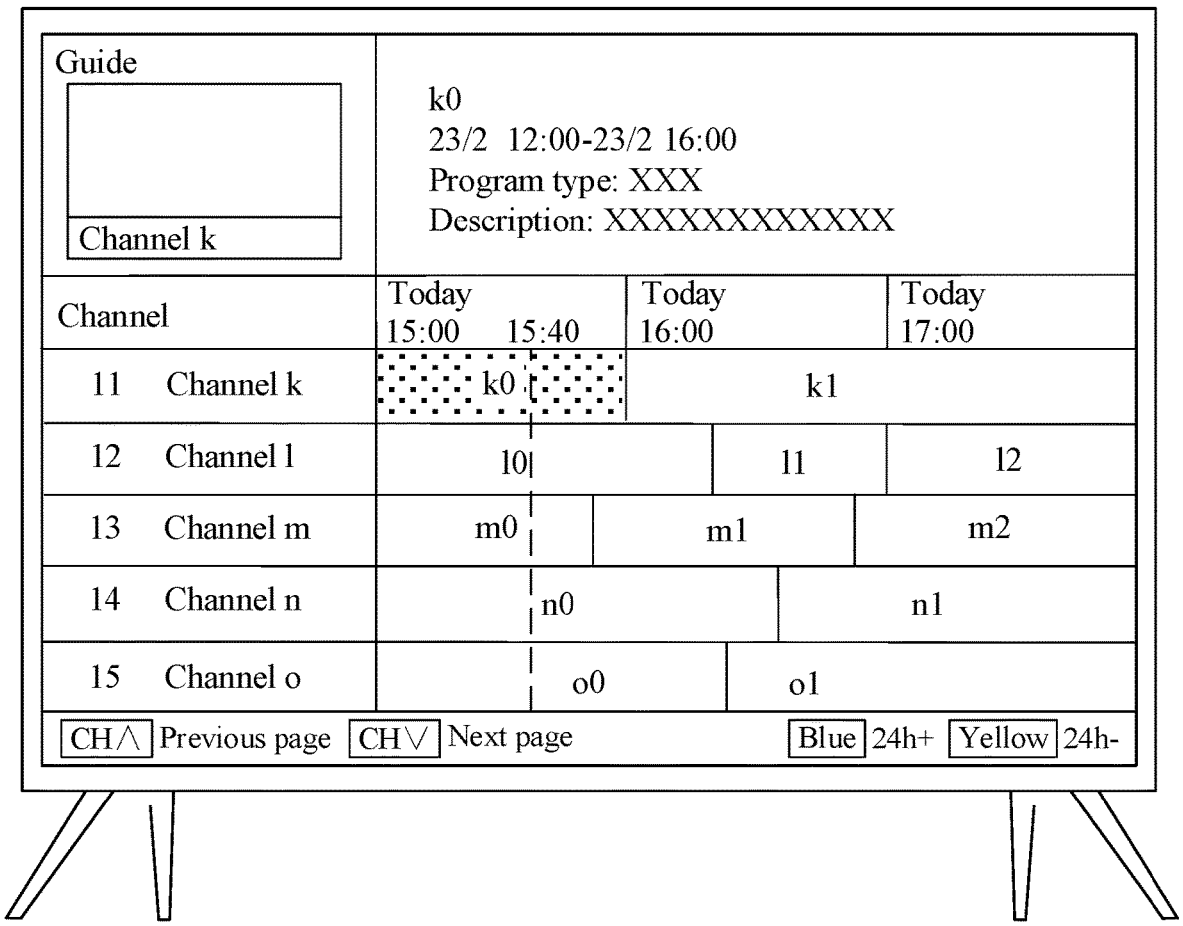

When the user wants to see the program menu in the previous page, the user can press the key "CH∧" on the control device 100; and the display apparatus 200 can receive a key event value of this key, extract information corresponding to said key "channel up", and then implement the function of displaying the program menu in the previous page. The program menu in the previous page is displayed in the GUI as shown in FIG. 2F.

It should be noted that the menu item icons corresponding to the menu items "channel up" and "channel down" may also be presented as color keys. The user presses the color key with the desired function on the control device 100, and the display apparatus 200 can receive a key event value of the color key, searches for the corresponding information and implements the function corresponding to the key event value received.

In this way, when the menu item content is provided on the display, the user presses a color key with a color indicated function on the control device 100, and the display apparatus 200 can receive a key event value of this color key, search for information corresponding to the color key in this context and implement the function corresponding to the key event value. It is intuitive for a user that a color key on the control device 100 corresponds to a menu item with this color indication to implement a desired function.

In view of the above FIGS. 1A-1E, it should be noted that the display apparatus usually displays the EPG thereon, so that the user can use the menu provided by the EPG to view the programs of channels (such as profiles of the program content, profiles of the actors and directors, etc.) or schedule to record future programs, etc. The EPG user interface arranges and presents program information in the form of matrix, and it usually presents channel information and time periods in a two-dimensional pattern and displays the program information in the EPG in size proportional to the length of the program playing time period.

The process of the EPG presentation includes: referring to FIG. 1C, the modem 210 of the display apparatus receives a broadcast signal, and the decoder (not shown in the figure) extracts the EPG information from the received broadcast signal and outputs the extracted EPG information to the internal bus. The controller 250 stores the EPG information output to the internal bus in the memory 260, for displaying the EPG user interface.

When the program image shown in FIG. 2A is currently shown on the display 275 of the display apparatus, an EPG display request signal input from the user via the user interface 265 is input to the controller 250. For example, the user presses a key for display EPG interface on the remote controller, then in response to the request sent from the user, the EPG user interface in FIG. 2B is presented on the display 275 through the video processor 270.

FIG. 2A shows a schematic diagram of a program image in the display apparatus 200.

As shown in FIG. 2A, the display apparatus may provide a display image to the display, where the display image may include at least one of image, text, video content. For example, the display image shown in FIG. 2A is a program image.

FIGS. 2B-2F show schematic diagrams of the EPG user interfaces presented on the display apparatus 200 by operating the control device 100.

In FIG. 2A, while the program image is displayed on the display of the display apparatus, when the user inputs a command for displaying the EPG by operating the control device, the display apparatus presents the EPG user interface in response to the command input.

For example, as shown in FIG. 2B, the user presses a key for displaying EPG on the control device, and the display apparatus may provide the display with the EPG user interface shown in FIG. 2B in response to a command associated with the key for displaying EPG.

As shown in FIG. 2B, the vertical direction is the channel axis direction, where different channels are displayed in different rows. The horizontal direction is the time axis direction, where information of the programs in each row are arranged in the order of playing duration, the size of the display area for each program represents its relative playing length, the start position of the display area represents the start playing point, the end position of the display area represents the end playing point, and the program title is shown in the display area. In FIG. 2B, five channels (channels a-e) are shown in the EPG user interface, and the programs of each channel are displayed in a row according to the program playing time sequence. For example, FIG. 2B shows the program menu from 15:00 to 18:00 on February 23: programs a0-a2 of channel a, programs b0-b1 of channel b, programs c0-c1 of channel c, programs d0-d2 of channel d, and programs e0-e3 of channel e.

When the selector (for example, it may be implemented as a focus) lands on a program, the EPG user interface shows the Guide of this program, where the Guide may include channel name, play time period, program type and description of this program. As shown in FIG. 2B, when the selector lands on the program d0, the channel d to which the program d0 belongs, play time period of the program d0, program type of the program d0 and description of the program d0 are displayed in the guide area located on the upper side of the EPG user interface.

In some embodiments, when a user needs to view the program menu of a channel in the next few days, the user needs to operate the directional keys on the remote controller to move the focus to an edge of the EPG user interface.

For example, referring to FIG. 2B, if a user needs to view the programs after 24 hours, firstly the user needs to operate the directional keys on the remote controller to move the focus to the edge of the EPG user interface according to the operation path of d0-d1-d2, and then operate the directional keys on the remote controller again, where the EPG user interface will present the program menu between 18:00-21:00 on February 23. After that, the user operates the directional keys on the remote controller many times, and the EPG user interface will present the program menu between 15:00-18:00 on February 24. Obviously, the above operations are complicated and cumbersome, affecting user's experience.

In view of the above issue, according to an embodiment, the user presses a color key on the remote controller after entering the EPG user interface, that is, in response to the user input, the EPG user interface is switched from a first presentation page to a second presentation page. In this way, the EPG user interface can directly present the program menu after the preset time unit, which allows for a user to quickly find the broadcast program to be watched, and improving user's experience.

Specifically, after receiving an EPG display request signal input from the user via the remote controller, the controller controls the display to enter the EPG user interface as shown in FIG. 2B in response to the user input. Meanwhile, the first presentation page shows channels a-e and the program menu of the channels a-e from 15:00 to 18:00 on February 23. After receiving the key event value associated with the color key sent from the user via the remote controller, referring to FIG. 2C, the controller switches the EPG user interface from the first presentation page to the second presentation page, that is, switches the EPG user interface as shown in FIG. 2B to the EPG user interface as shown FIG. 2C, based on the first presentation page presented by the EPG user interface and the preset time unit.

FIG. 2C is an exemplary EPG user interface presented after the key event of a color key. In FIG. 2C, five channels (channels a-e) are shown in the EPG user interface, and the programs of each channel are displayed in a row according to the program playing time sequence. FIG. 2C shows the program menu from 15:00 to 18:00 on February 24: programs a3-a5 of channel a, programs b2-b4 of channel b, programs c2-c3 of channel c, programs d3-d5 of channel d, and programs e4-e5 of channel e.

FIG. 2D is another exemplary EPG user interface presented after the key event of a color key. In FIG. 2D, five channels (channels a-e) are shown in the EPG user interface, and the programs of each channel are displayed in a row according to the program playing time sequence. FIG. 2C shows the program menu from 15:00 to 18:00 on February 22: programs a6-a7 of channel a, programs b5-b7 of channel b, programs c4-c5 of channel c, programs d6-d7 of channel d, and programs e6-e7 of channel e.

Furthermore, when the user presses a shortcut key on the remote controller, that is, the controller determines to trigger the key event of the shortcut key in response to a user input, the controller changes the EPG user interface. Exemplarily, if the presentation page currently presented on the EPG user interface is that as shown in FIG. 2B, the EPG user interface is switched from the user interface as shown in FIG. 2B to the user interface as shown in FIG. 2E or FIG. 2F.

FIG. 2E is an exemplary EPG user interface presented after a key event of the shortcut key. In FIG. 2E, five channels (channels f-j) are shown in the EPG user interface, and the programs of each channel are displayed in a row according to the program playing time sequence. FIG. 2E shows the program menu from 15:00 to 18:00 on February 23: programs f0-f2 of channel f, programs g0-g1 of channel g, programs h0-h2 of channel h, programs i0-i2 of channel i, and programs j0-j3 of channel j.

FIG. 2F is another exemplary EPG user interface presented after a key event of the shortcut key. In FIG. 2F, five channels (channels k-o) are shown in the EPG user interface, and the programs of each channel are displayed in a row according to the program playing time sequence. FIG. 2F shows the program menu from 15:00 to 18:00 on February 23: programs k0-k1 of channel k, programs l0-l2 of channel l, programs m0-m2 of channel m, programs n0-n1 of channel n, and programs o0-o1 of channel o.

The embodiments of the disclosure will be further described in detail below with reference to the accompanying drawings.

Figure 3A:
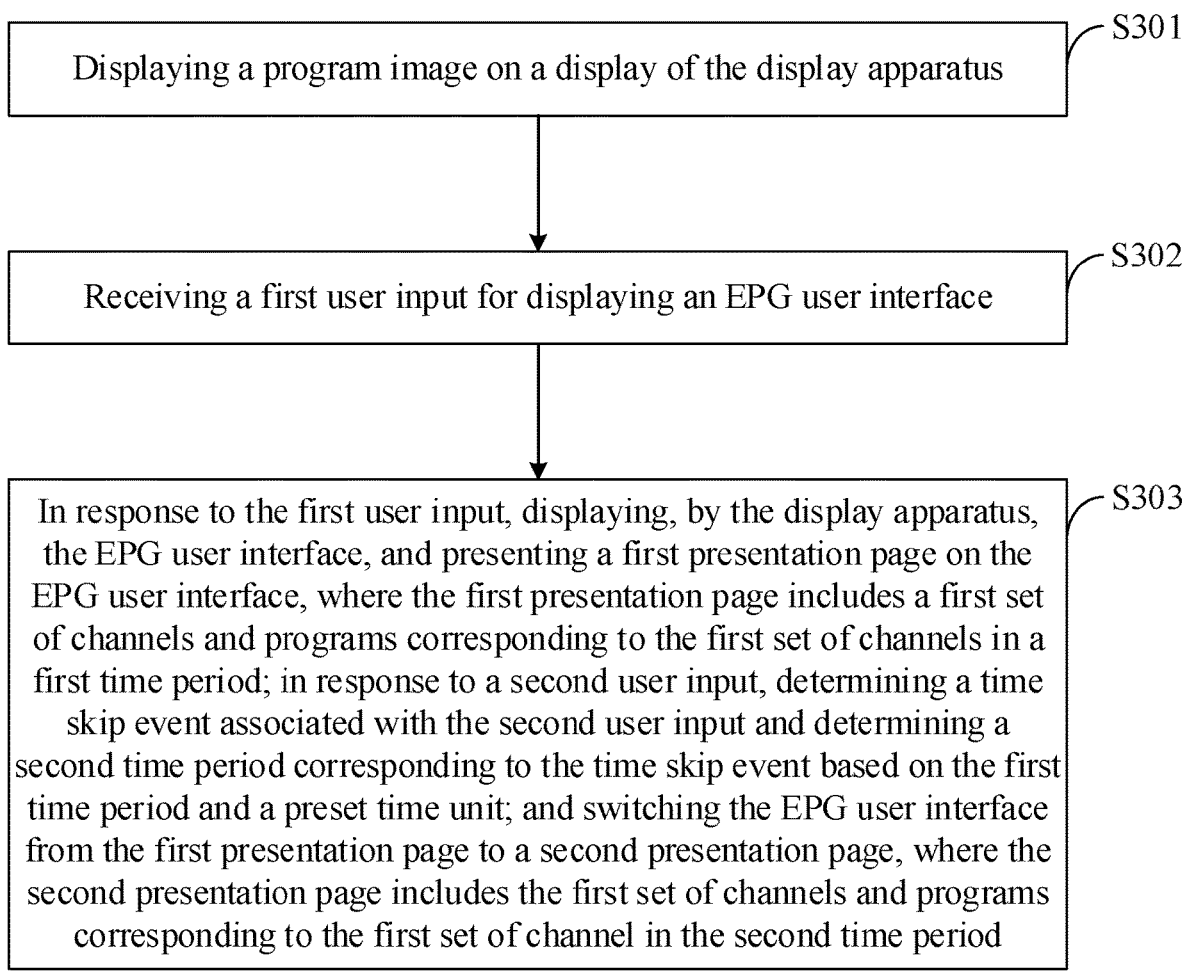
FIG. 3A shows a schematic flowchart of a presentation method of an EPG user interface according to an embodiment.

Referring to FIG. 3A, a presentation method of an EPG user interface in a display apparatus according to an embodiment may include the following process.

Step S301: displaying a program image on a display of the display apparatus.

Step S302: receiving a first user input for displaying an EPG user interface.

Step S303: in response to the first user input, displaying, by the display apparatus, the EPG user interface, and presenting a first presentation page on the EPG user interface, where the first presentation page includes a first set of channels and programs corresponding to the first set of channels in a first time period;
  in response to a second user input, determining a time skip event associated with the second user input and determining a second time period corresponding to the time skip event based on the first time period and a preset time unit; and switching the EPG user interface from the first presentation page to a second presentation page, where the second presentation page includes the first set of channels and programs corresponding to the first set of channel in the second time period.

Figure 3B:
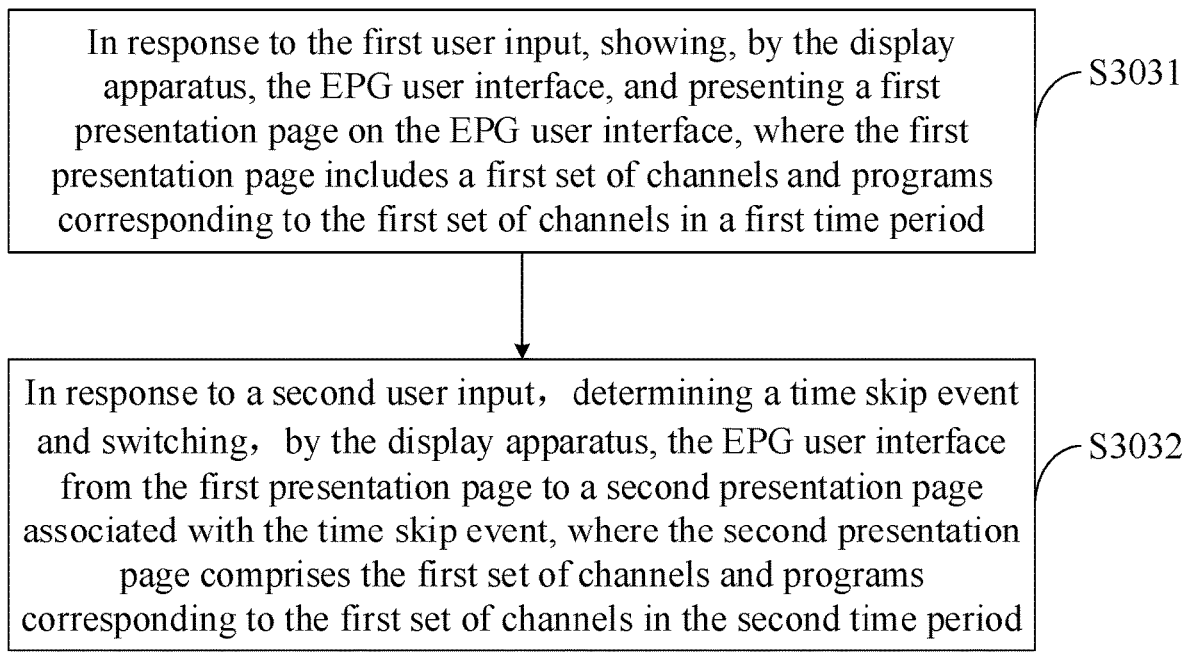
FIG. 3B shows a schematic diagram of a switching process of the EPG user interface according to an embodiment.

Specifically, as shown in FIG. 3B, when the step S303 is performed, the following steps may be specifically performed but not limited to the following.

Step S3031: in response to the first user input, showing, by the display apparatus, the EPG user interface, and presenting a first presentation page on the EPG user interface, where the first presentation page includes a first set of channels and programs corresponding to the first set of channels in a first time period.

Specifically, while displaying a program image, the display apparatus responds to the first user input to show the EPG user interface.

According to an embodiment, the first user input includes, but is not limited to, an input for instructing to present the EPG user interface, such as an EPG key on a remote controller, a voice command, a shortcut key for showing EPG, etc.

For example, referring to FIG. 2A, the display apparatus displays a program image of the program d0, and determines to present the EPG user interface as shown in FIG. 2B in response to a command associated with a key for showing EPG on the remote controller.

In some embodiments, the display apparatus may determine the first presentation page on the EPG user interface by, but not limited to, the following steps.

A1. The display apparatus determines a first set of channels to be presented based on a channel corresponding to the program image, a pre-stored channel list and a preset number of channels for presentation.

According to an embodiment, the first set of channels to be presented may be determined by, but not limited to, the following method:

before determining the first set of channels to be presented, dividing the channel list into multiple sets of channels based on the preset number of channels for presentation.

For example, assuming that the number of channels for presentation is 5 and the channel list is as shown in Table 1, the channel list is divided into a channel set 1, a channel set 2 and a channel set 3 based on the number of channels for presentation being 5, where the channel set 1 includes channels a-e, the channel set 2 includes channels f-j, and the channel set 3 includes channels k-o.

Further, based on the channel corresponding to the program image and the channel list, the display apparatus determines an index of this channel in the channel list, and then determines the first set of channels to be presented according to the index and the preset number of channels for presentation.

Assuming that the number of channels for presentation is represented as pageSize, then the serial number (currentPage) of the channel set is calculated by the following formula:

$$\text{currentPage} = \text{floor}\left(\frac{\text{index}}{\text{pageSize}}\right) + 1$$

$$\text{focusChannel} = \text{index} \% \text{pageSize}$$

where the floor function is used to round down.

For example, the display apparatus displays the program image of the program d0, and the program d0 corresponds to the channel d. Based on the channel d and the channel list, it is determined that the index of the channel d in the channel list is 3. According to the index 3 and the number of channels for presentation being 5, the serial number of the channel set is 1 calculated by the above formula, that is, the first set of channels to be presented is determined as the channel set 1.

TABLE 1

| Channel List | | |
|---|---|---|
| Index | Channel Name | Channel Number |
| 0 | Channel a | 1 |
| 1 | Channel b | 2 |
| 2 | Channel c | 3 |

TABLE 1-continued

| Channel List | | |
|---|---|---|
| Index | Channel Name | Channel Number |
| 3 | Channel d | 4 |
| 4 | Channel e | 5 |
| 5 | Channel f | 6 |
| 6 | Channel g | 7 |
| 7 | Channel h | 8 |
| 8 | Channel i | 9 |
| 9 | Channel j | 10 |
| 10 | Channel k | 11 |
| 11 | Channel l | 12 |
| 12 | Channel m | 13 |
| 13 | Channel n | 14 |
| 14 | Channel o | 15 |

A2. The display apparatus determines the first time period based on the current time and a preset time period range.

For example, assuming that the preset time period range is 3 hours and the current time is 15:40 on Feb. 23, 2019, the display apparatus determines the first time period based on the current time and the time period range, where the first time period is 15:00 to 18:00 on Feb. 23, 2019.

A3. The display apparatus determines the first presentation page based on the preset channel program information, the first set of channels to be presented and the first time period, where the first presentation page includes the first set of channels and programs corresponding to the first set of channels in the first time period.

As shown in FIG. 2B, the display apparatus determines the first presentation page based on the channel program information, the first set of channels to be presented and the first time period. The first presentation page includes the first set of channels and programs corresponding to the first set of channels in the first time period, where the first set of channels includes channels a-e; and the programs of the channel a are programs a0-a2, the programs of the channel b are programs b0-b1, the programs of the channel c are programs c0-c1, the programs of the channel d are programs d0-d2, and the programs of the channel e are programs e0-e3 from 15:00 to 18:00 on Feb. 23, 2019.

The display apparatus displays the EPG user interface on the program image, and presents the first presentation page on the EPG user interface.

For example, referring to FIG. 2B, the display apparatus presents the first presentation page on the EPG user interface, where the first presentation page includes five channels (channels a-e), and the programs of each channel are arranged and displayed as one line in time order of program playing time period.

Step S3032: in response to a second user input, determining a time skip event and switching, by the display apparatus, the EPG user interface from the first presentation page to a second presentation page associated with the time skip event, where the second presentation page comprises the first set of channels and programs corresponding to the first set of channels in the second time period.

It should be noted that, the step S3032 may be performed right after the step S3031, or the step S3032 may be performed after the step S3031 is performed and the channel presentation page is switched (for example, the channel presentation page is switched by the left and right directional keys on the remote controller), which is not limited in the disclosure. But for convenience of description, the case where the step S3032 is performed right after the step S3031 is taken as an example for illustration.

According to an embodiment, when the display apparatus determines to trigger a time skip event in response to the second user input, since the second user input corresponds to a menu item 24 h+ or 24 h−, the specified time skip event may include two cases.

Case 1: The specified time skip event responds to an operation of a key associated with the menu item 24 h+.

Specifically, the display apparatus determines a first start point based on the first time period, where the first start point is the start point of the first time period.

For example, the first time period is 15:00 to 18:00 on Feb. 23, 2019, and the display apparatus determines that the first start point is 15:00 on Feb. 23, 2019.

After determining the first start point, the display apparatus determines a second start point based on the first start point and a preset time unit.

For example, assuming that the preset time unit is 24 hours, the display apparatus determines that the second start point is 15:00 on Feb. 24, 2019 based on the first start point at 15:00 on Feb. 23, 2019 and the preset time unit.

After determining the second start point, a second end point of the second time period is determined based on the second start point and the preset time period range.

For example, based on the second start point at 15:00 on Feb. 24, 2019 and the preset time period range, the display apparatus determines that the second end point is 18:00 on Feb. 24, 2019.

In some embodiments, when the display apparatus determines that the second start point is within a preset valid range, the time period from the second start point to the second end point is used as the second time period.

For example, assuming that a preset valid range is from 15:00 on Feb. 23, 2019 to 24:00 on Feb. 28, 2019, the display apparatus uses the time period from 15:00 on Feb. 24, 2019 to 18:00 on Feb. 24, 2019 as the second time period when determining that the second start point is within the range from 15:00 on Feb. 23, 2019 to 24:00 on Feb. 28, 2019, that is, the second time period is 15:00 to 18:00 on Feb. 24, 2019.

If the display apparatus determines that the second start point is not within the preset valid range, it alerts the user on the EPG user interface.

For example, assuming that the preset valid range is from 15:00 on Feb. 23, 2019 to 24:00 on Feb. 28, 2019 and the second start point is 15:00 on Mar. 1, 2019, then the second start point is not within the valid range in this case, and the display apparatus may alert the user through a pop-up window on the EPG user interface.

In some embodiments, the display apparatus switches the EPG user interface from the first presentation page to the second presentation page, where the second presentation page includes the first set of channels and programs corresponding to the first set of channels in the second time period.

For example, the display apparatus switches the EPG user interface from FIG. 2B to FIG. 2C, and the second presentation page includes the first set of channels and programs corresponding to the first set of channels in the second time period. Referring to FIG. 2C, the first set of channels includes channels a-e, where the programs of the channel a are programs a3-a5, the programs of the channel b are programs b2-b4, the programs of the channel c are programs c2-c3, the programs of the channel d are programs d3-d5, and the programs of the channel e are programs e4-e5 from 15:00 to 18:00 on Feb. 24, 2019.

Case 2: The time skip event responds to an operation of a key associated with the menu item 24 h−.

Case 2 is similar to Case 1, and the Case 2 is only described here in brief.

Specifically, the display apparatus determines a first start point based on the first time period, where the first start point is the start point of the first time period.

For example, the first time period is 15:00 to 18:00 on Feb. 23, 2019, and the display apparatus determines that the first start point is 15:00 on Feb. 23, 2019 based on the first time period.

After determining the first start point, the display apparatus determines a second start point based on the first start point and a preset time unit.

For example, assuming that the preset time unit is 24 hours, the display apparatus determines that the second start point is 15:00 on Feb. 22, 2019 based on the first start point at 15:00 on Feb. 23, 2019 and the preset time unit.

After determining the second start point, a second end point of the second time period is determined based on the second start point and the preset time period range.

For example, based on the second start point at 15:00 on Feb. 22, 2019 and the preset time period range, the display apparatus determines that the second end point is 18:00 on Feb. 22, 2019.

In some embodiments, when the display apparatus determines that the second start point is within a preset valid range, the time period from the second start point to the second end point is used as the second time period.

For example, the preset valid range is from 00:00 on Feb. 22, 2019 to 24:00 on Feb. 28, 2019, and the display apparatus uses the time period from 15:00 on Feb. 22, 2019 to 18:00 on Feb. 22, 2019 as the second time period when determining that the second start point is within the range from 00:00 on Feb. 22, 2019 to 24:00 on Feb. 28, 2019, that is, the second time period is 15:00 to 18:00 on Feb. 22, 2019.

In some embodiments, the display apparatus switches the EPG user interface from the first presentation page to the second presentation page, where the new channel presentation page includes the first set of channels and programs corresponding to the first set of channels in the second time point.

For example, the display apparatus switches the EPG user interface from the first presentation page to the second presentation page, as shown in FIGS. 2B and 2D, that is, the display apparatus changes the EPG user interface from FIG. 2B to FIG. 2D.

Figure 4A:
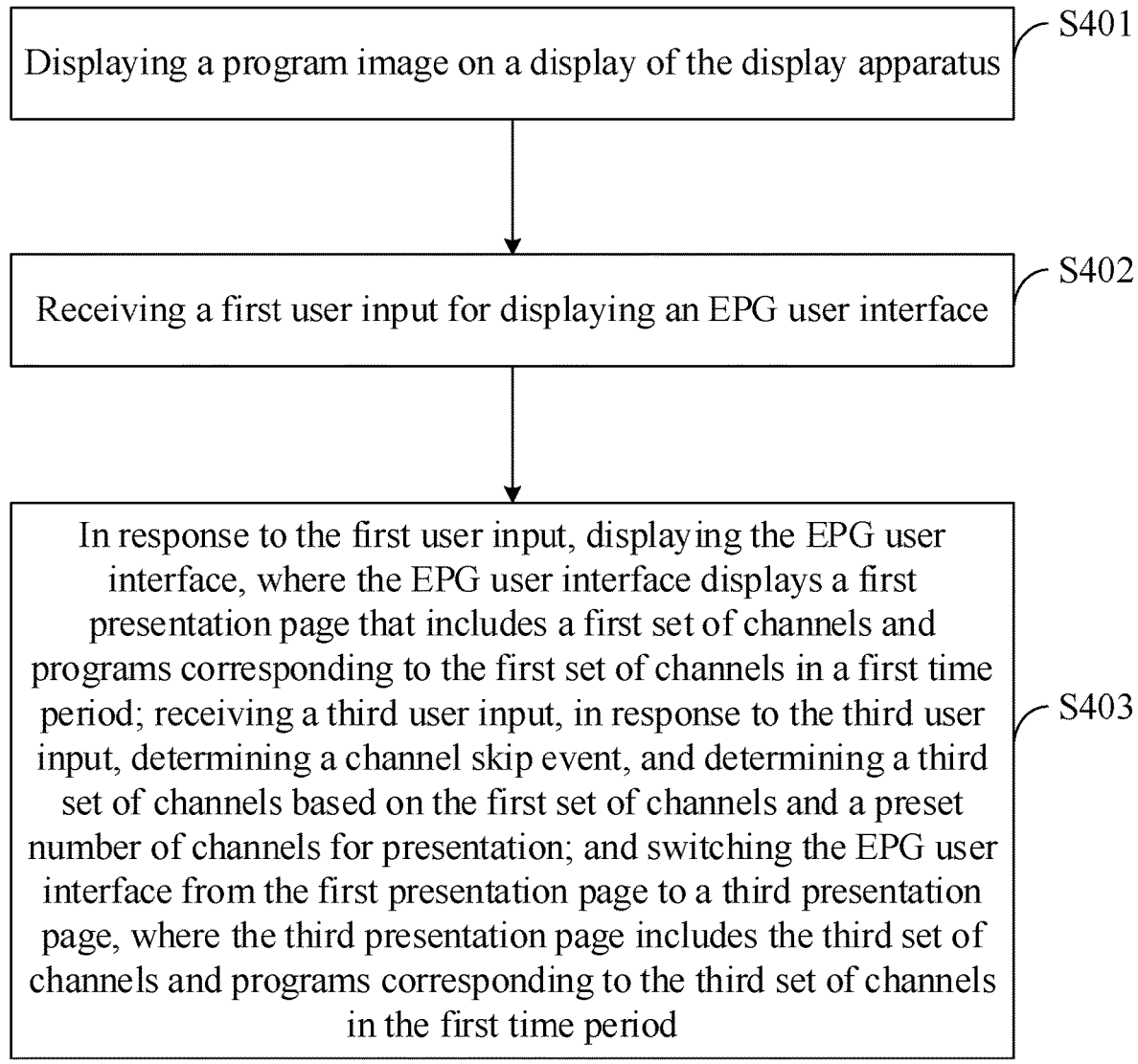
FIG. 4A shows a schematic flowchart of another presentation method of an EPG user interface provided according to an embodiment.

Referring to FIG. 4A, a presentation method of an EPG user interface according to an embodiment may include the following process.

Step S401: displaying a program image on a display of the display apparatus.

Step S402: receiving a first user input for displaying an EPG user interface.

Step S403: in response to the first user input, displaying the EPG user interface, where the EPG user interface displays a first presentation page that includes a first set of channels and programs corresponding to the first set of channels in a first time period; receiving a third user input, in response to the third user input, determining a channel skip event, and determining a third set of channels based on the first set of channels and a preset number of channels for presentation; and switching the EPG user interface from the first presentation page to a third presentation page, where the third presentation page includes the third set of channels and programs corresponding to the third set of channels in the first time period.

Figure 4B:
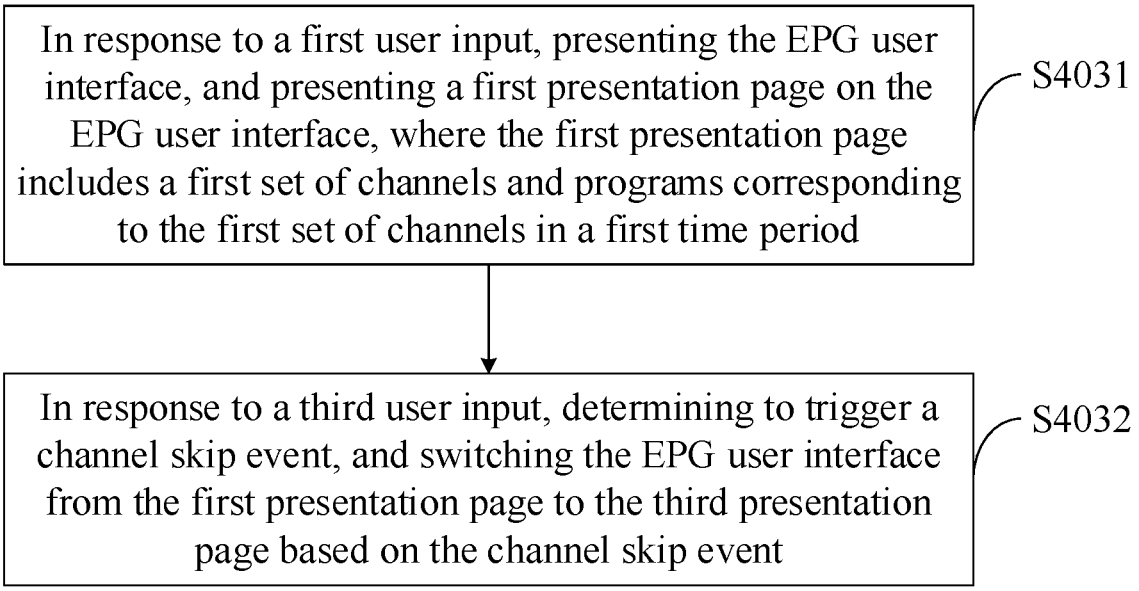
FIG. 4B shows a schematic diagram of another switching process of the EPG user interface according to an embodiment.

Specifically, as shown in FIG. 4B, when the step S403 is performed, the following steps may be specifically performed but not limited to the following.

S4031: in response to a first user input, presenting the EPG user interface, and presenting a first presentation page on the EPG user interface, where the first presentation page includes a first set of channels and programs corresponding to the first set of channels in a first time period.

The step S4031 is performed in similar manner as the step S3031, and will not be repeated here.

Step S4032: in response to a third user input, determining to trigger a channel skip event, and switching the EPG user interface from the first presentation page to the third presentation page based on the channel skip event.

According to an embodiment, when the display apparatus determines to trigger the channel skip event as a response to the third user input, since the third user input corresponds to operation of a channel up key or channel down key on the remote controller, the channel jump skip specifically includes two cases.

Case 1: The channel skip event responds to an operation on the channel down key.

Specifically, when presenting the first presentation page on the EPG user interface, the display apparatus determines to trigger a channel skip event in response to an operation on the channel down key, where the first presentation page comprises the first set of channels and programs corresponding to the first set of channels in the second time period.

For example, the display apparatus presents the first presentation page on the EPG user interface. In this case, the first presentation page is the first presentation page shown in FIG. 2B, and the first presentation page includes channels a-e and programs corresponding to the channels a-e from 15:00 to 18:00 on Feb. 23, 2019. The display apparatus determines to trigger a channel skip event in response to an operation of the channel down key.

The display apparatus may determine the third presentation page by, but not limited to, the following steps.

B1. The display apparatus determines the first set of channels based on the first presentation page.

For example, the first presentation page includes channels a-e and programs corresponding to the channels a-e from 15:00 to 18:00 on Feb. 23, 2019, and the first set of channels is determined as the set including channels a-e.

B2. The display apparatus determines the third set of channels based on the first set of channels, a pre-stored channel list, a preset number of channels for presentation, and a preset channel update parameter.

For example, assuming that the preset channel update parameter is 5, the display apparatus determines that the third set of channels includes channels f-j based on the first set of channels, Table 1, the number of channels for presentation being 5, and the channel update parameter being 5.

B3. The display apparatus determines programs corresponding to the third set of channels in the first time period based on the first time period and the preset channel program information.

For example, the first time period is 15:00 to 18:00 on Feb. 23, 2019, and the preset channel program information includes programs corresponding to the channels f-j from 15:00 to 18:00 on Feb. 23, 2019. The display apparatus determines, based on the first time period and the preset channel program information, that the programs of the channel f are programs f0-f2, the programs of the channel g are programs g0-g1, the programs of the channel h are programs h0-h2, the programs of the channel i are programs i0-i2, and the programs of the channel j are programs j0-j3 from 15:00 to 18:00 on Feb. 23, 2019.

B4. The display apparatus determines a third presentation page, which includes the third set of channels and the programs corresponding to the third set of channels in the first time period.

Referring to FIG. 2E, the display apparatus determines the third presentation page, which includes channels f-j, and the programs f0-f2 of the channel f, the programs g0-g1 of the channel g, the programs h0-h2 of the channel h, the programs i0-i2 of the channel i, and the programs j0-j3 of the channel j from 15:00 to 18:00 on Feb. 23, 2019.

In some embodiments, the display apparatus switches the EPG user interface from the first presentation page to the third presentation page.

Referring to FIGS. 2B and 2E, the display apparatus switches the EPG user interface from the first presentation page to the third presentation page, that is, the display apparatus switches the interface as shown in FIG. 2B to that as shown in FIG. 2E.

Case 2: The channel skip event responds to an operation of the channel up key.

Specifically, when presenting the first presentation page on the EPG user interface, the display apparatus determines to trigger a channel skip event in response to an operation of the channel up key, where the first presentation page includes the first set of channels and programs corresponding to the first set of channels in the first time period.

For example, the display apparatus presents the first presentation page on the EPG user interface. In this case, as shown in FIG. 2B, the first presentation page includes channels a-e and programs corresponding to the channels a-e from 15:00 to 18:00 on Feb. 23, 2019. The display apparatus determines to trigger a channel skip event in response to an operation of the channel up key.

The display apparatus may determine a third presentation page by, but not limited to, the following steps.

C1. The display apparatus determines the first set of channels based on the first presentation page.

For example, the first presentation page includes channels a-e and programs corresponding to the channels a-e from 15:00 to 18:00 on Feb. 23, 2019, and the first set of channels is determined as the set including channels a-e.

C2. The display apparatus determines the third set of channels based on the first set of channels, a pre-stored channel list, a preset number of channels for presentation, and a preset channel update parameter.

For example, assuming that the preset channel update parameter is 5, the display apparatus determines that the third set of channels includes channels k-o based on the first set of channels (channels a-e), Table 1, the number of channels for presentation and the channel update parameter.

C3. The display apparatus determines programs corresponding to the third set of channels in the first time period based on the first time period and the preset channel program information.

For example, the first time period is 15:00 to 18:00 on Feb. 23, 2019, and the preset channel program information includes programs corresponding to the channels k-o from 15:00 to 18:00 on Feb. 23, 2019. The display apparatus determines, based on the first time period and the preset channel program information, that the programs of the channel k are programs k0-k1, the programs of the channel l are programs l0-l2, the programs of the channel m are programs m0-m2, the programs of the channel n are programs n0-n1, and the programs of the channel o are programs o0-o1 from 15:00 to 18:00 on Feb. 23, 2019.

C4. The display apparatus determines the third presentation page, which includes the third set of channels and the programs corresponding to the third set of channels in the first time period.

Referring to FIG. 2F, the display apparatus determines the third presentation page, which includes channels k-o, and the programs k0-k2 of the channel k, the programs l0-l1 of the channel l, the programs m0-m2 of the channel m, the programs n0-n2 of the channel n, and the programs o0-o3 of the channel o from 15:00 to 18:00 on Feb. 23, 2019.

In some embodiments, the display apparatus switches the EPG user interface from the first presentation page to the third presentation page.

Referring to FIGS. 2B and 2F, the display apparatus switches the EPG user interface from the first presentation page to the third presentation page, that is, the display apparatus switches the interface shown in FIG. 2B to that as shown in FIG. 2F.

A full implementation scenario is described below.

In response to an operation of a key for showing EPG on the remote controller, a smart TV displays the EPG user interface and presents a first presentation page on the EPG user interface. Referring to FIG. 2B, the first presentation page includes channels a-e, and programs corresponding to the channels a-e from 15:00 to 18:00 on Feb. 23, 2019.

If the smart TV determines to trigger a time skip event in response to an operation of a key associated with the menu item 24 h+ on the remote controller, it determines a first start point as 15:00 on Feb. 23, 2019 based on the first time period from 15:00 to 18:00 on Feb. 23, 2019 in the first presentation page, and then determines a second start point as 15:00 on Feb. 24, 2019 based on 15:00 on Feb. 23, 2019 and the preset time unit of 24 hours.

In some embodiments, when determining that 15:00 on Feb. 23, 2019 is within the valid range from 15:00 on Feb. 23, 2019 to 24:00 on Feb. 28, 2019, the display apparatus determines the second time period as 15:00 to 18:00 on Feb. 24, 2019.

Further, referring to FIG. 2C, the EPG user interface is switched from the first presentation page to the second presentation page, which includes channels a-e, and programs corresponding to the channels a-e from 15:00 to 18:00 on Feb. 24, 2019.

If the smart TV determines to trigger a channel skip event in response to an operation of the channel down key on the remote controller, the display apparatus determines the first set of channels as channels a-e based on the first presentation page.

Based on the channels a-e, the first set of channels, Table 1, the number of channels for presentation, and the channel update parameter, it is determined that the third set of channels includes channels f-j.

Then, the display apparatus determines programs corresponding to the channels f-j from 15:00 to 18:00 on Feb. 23, 2019 based on the first time period from 15:00 to 18:00 on Feb. 23, 2019 and the preset channel program information.

Finally, the EPG user interface is switched from the first presentation page to the third presentation page, which contains channels f-j and the programs corresponding to the channels f-j from 15:00 to 18:00 on Feb. 23, 2019.

An embodiment of the disclosure provides a non-transitory memory storage medium for storing computer instructions which are configured to cause a computer to perform the above method embodiments.

When determining to trigger a time skip event or a channel skip event, the display apparatus switches the EPG user interface from the first presentation page to another presentation page, so that the display apparatus can switch the presentation page in the EPG user interface directly based on the user input, without the need for receiving the directional key commands many times to control the focus move multiple times and switch the presentation page in the EPG user interface, reducing inconvenient repetitive operations, realizing the rapid response of presentation page switch, and thus improving user's experience.

The foregoing embodiments are provided for purpose of illustration and description, and are not intended to list or limit the disclosure. Individual elements or features in a specific embodiment are generally not limited to this specific embodiment, but, where applicable, may be used or interchanged in a selected embodiment even if not specifically shown or described. Likewise, many forms of variations are possible, these variations are not to be considered as departing from the scope of the appended claims of the disclosure, and all such modifications are encompassed within the scope of the appended claims of the disclosure.

What is claimed is:

1. A display apparatus, comprising:
a display that displays an image;
a remote controller with at least one key;
a user input interface that receives a user input from the remote controller;
a controller in communication with the display and the user input interface, and that:
   displays a program image on the display;
   in response to a first input command from a user, displays an Electronic Program Guide (EPG) user interface on the display, wherein the EPG user interface comprises a first presentation page, and the first presentation page comprises a first set of channels and programs corresponding to the first set of channels in a first time period,
   wherein a pre-stored channel list is divided into multiple sets of channels, each set of channels having a serial numbers and each set of channels corresponding to one presentation page, and a serial number of the first set of channels is determined, among the multiple sets of channels, as a sum of a first value plus 1, according to following formula:

$$\text{Serial number} = \text{floor}\left(\frac{\text{index}}{\text{PageSize}}\right) + 1$$

wherein the first value is obtained by a "floor" function for rounding down a ratio of an "index" of a channel corresponding to the program image displayed on the display, and a "pageSize" indicating a preset quantity of channels for one presentation page on an EPG user interface; and
   in response to a second input command associated with a first shortcut key on the remote controller, switches the EPG user interface from the first presentation page to a second presentation page, wherein the second presentation page comprises the first set of channels and programs corresponding to the first set of channels in a second time period different from the first time period, wherein a difference between the first time period and the second time period is a preset time unit and the first shortcut key is configured for the EPG user interface and visually indicated on the EPG user interface.

2. The display apparatus of claim 1, wherein the preset time unit is 24 hours.

3. The display apparatus of claim 1, wherein the first shortcut key is in a form of color key, and the remote controller comprises a first color key with a first color indication, the EPG user interface comprises: a first menu item with the first color indication for visually associating a function of the first menu item with the first color key.

4. The display apparatus of claim 3, wherein the remote controller further comprises a second color key with a second color indication different from the first color indication, the EPG user interface further comprises: a second menu item with the second color indication for visually associating a function of the second menu item with the second color key.

5. The display apparatus of claim 1, wherein the controller:
   determines the first set of channels based on the serial number of the first set of channels and channels in the pre-stored channel list;
   determines the first time period based on current time of the display apparatus and a preset time period range;
   determines programs corresponding to the first set of channels in the first time period based on the first set of channels and the first time period; and
   displays, the EPG user interface comprising the first presentation page, on the program image, wherein programs in the first time period are presented in the first presentation page.

6. The display apparatus of claim 1, wherein the controller:
   determines a second start point of the second time period based on a first start point of the first time period and the preset time unit;
   determines a second end point of the second time period based on the second start point and the preset time period range;
   determines programs corresponding to the first set of channels in the second time period based on the first set of channels and the second time period; and
   displays the second presentation page, wherein programs in the second time period are presented in the second presentation page.

7. The display apparatus of claim 1, wherein the remote controller further comprises a second shortcut key different from the first shortcut key and configured for implementing a first function in the EPG user interface, the controller:
   receives a third input command associated with an operation of the second shortcut key, wherein the second shortcut key is visually indicated on the EPG user interface; and
   in response to the third input command, switches the EPG user interface from the first presentation page to a third presentation page, wherein the third presentation page comprises a third set of channels and programs corresponding to the third set of channels in the first time period, the first set of channels is different from the third set of channels.

8. The display apparatus of claim 7, wherein the second shortcut key is a color key with a color indication.

9. The display apparatus of claim 7, wherein the second shortcut key is a key without a color indication and configured for implementing a second function in other context other than the EPG user interface.

10. The display apparatus of claim 7, wherein the controller:
   determines the first set of channels based on the serial number of the first set of channels and channels in the pre-stored channel list;
   determines the first time period based on current time and a preset time period range;
   determines programs corresponding to the first set of channels in the first time period based on the first set of channels and the first time period; and
   displays, the EPG user interface comprising the first presentation page, on the program image, wherein programs in the first time period are presented in the first presentation page.

11. The display apparatus of claim 10, wherein the controller:
   determines the third set of channels based on the first set of channels, channels in the pre-stored channel list, and the preset quantity of channels for presentation;
   determines programs corresponding to the third set of channels in the first time period based on the third set of channels and the first time period; and
   displays the third presentation page, wherein programs in the first time period are presented in the third presentation page.

12. A presentation method of an Electronic Program Guide (EPG) user interface, comprising:
   displaying, by a display apparatus, a program image on a display of the display apparatus;
   in response to a first input command from a user, displaying, by the display apparatus, the EPG user interface on the display, wherein the EPG user interface comprises a first presentation page, and the first presentation page comprises a first set of channels and programs corresponding to the first set of channels in a first time period,
   wherein a pre-stored channel list is divided into multiple sets of channels, each set of channels having a serial numbers and each set of channels corresponding to one presentation page, and a serial number of the first set of channels is determined, among the multiple sets of channels, as a sum of a first value plus 1, according to following formula:

$$\text{Serial number} = \text{floor}\left(\frac{\text{index}}{\text{PageSize}}\right) + 1$$

wherein the first value is obtained by a "floor" function for rounding down a ratio of an "index" of a channel corresponding to the program image displayed on the display, and a "pageSize" indicating a preset quantity of channels for one presentation page on an EPG user interface; and
   in response to a second input command associated with a first shortcut key on a remote controller, switching, by the display apparatus, the EPG user interface from the first presentation page to a second presentation page, wherein the second presentation page comprises the first set of channels and programs corresponding to the first set of channels in a second time period different from the first time period, wherein a difference between the first time period and the second time period is a preset time unit, and the first shortcut key is configured for the EPG user interface and visually indicated on the EPG user interface.

13. The method of claim 12, wherein the first shortcut key is in a form of color key, and the remote controller comprises a first color key with a first color indication, the EPG user interface comprises: a first menu item with the first color indication for visually associating a function of the first menu item with the first color key.

14. The method of claim 13, wherein the remote controller further comprises a second color key with a second color indication different from the first color indication, the EPG user interface further comprises: a second menu item with the second color indication for visually associating a function of the second menu item with the second color key.

15. The method of claim 13, further comprising:
in response to the first input command from the user, displaying, by the display apparatus, the EPG user interface on the display, comprises:
determining, by the display apparatus, the first set of channels based on the serial number of the first set of channels and channels in the pre-stored channel list;
determining, by the display apparatus, the first time period based on current time of the display apparatus and a preset time period range;
determining, by the display apparatus, programs corresponding to the first set of channels in the first time period based on the first set of channels and the first time period; and
displaying, by the display apparatus, the EPG user interface comprising the first presentation page, on the program image, wherein programs in the first time period are presented in the first presentation page.

16. The method of claim 12, further comprising:
determining, by the display apparatus, a second start point of the second time period based on a first start point of the first time period and the preset time unit;
determining, by the display apparatus, a second end point of the second time period based on the second start point and the preset time period range;
determining, by the display apparatus, programs corresponding to the first set of channels in the second time period based on the first set of channels and the second time period; and
displaying, by the display apparatus, the second presentation page, wherein programs in the second time period are presented in the second presentation page.

17. The method of claim 12, further comprising:
receiving, by the display apparatus, a third input command associated with an operation of a second shortcut key on the remote controller, wherein the second shortcut key is different from the first short cut key, and configured for implementing a first function in the EPG user interface and visually indicated on the EPG user interface; and
in response to the third input command, switching, by the display apparatus, the EPG user interface from the first presentation page to a third presentation page, wherein the third presentation page comprises a third set of channels and programs corresponding to the third set of channels in the first time period, the first set of channels is different from the third set of channels.

18. The method of claim 17, wherein the second shortcut key is a color key with a color indication; or the second shortcut key is a key without a color indication and configured for implementing a second function in other context other than the EPG user interface.

19. The method of claim 17, further comprising:
determining, by the display apparatus, the first set of channels based on the serial number of the first set of channels and channels in the pre-stored channel list;
determining, by the display apparatus, the first time period based on current time and a preset time period range;
determining, by the display apparatus, programs corresponding to the first set of channels in the first time period based on the first set of channels and the first time period; and
displaying, by the display apparatus, the EPG user interface comprising the first presentation page, on the program image, wherein programs in the first time period are presented in the first presentation page.

20. The method of claim 19, further comprising:
determining, by the display apparatus, the third set of channels based on the first set of channels, channels in the pre-stored channel list, and the preset quantity of channels for presentation;
determining, by the display apparatus, programs corresponding to the third set of channels in the first time period based on the third set of channels and the first time period; and
displaying, by the display apparatus, the third presentation page, wherein programs in the first time period are presented in the third presentation page.

* * * * *